(12) United States Patent
Fujii

(10) Patent No.: US 12,736,943 B2
(45) Date of Patent: Sep. 15, 2026

(54) INFORMATION PROCESSING DEVICE AND INFORMATION PROCESSING METHOD

(71) Applicant: ULVAC, Inc., Kanagawa (JP)

(72) Inventor: Yoshinori Fujii, Kanagawa (JP)

(73) Assignee: Ulvac, Inc., Kanagawa (JP)

( * ) Notice: Subject to any disclaimer, the term of this patent is extended or adjusted under 35 U.S.C. 154(b) by 442 days.

(21) Appl. No.: 18/237,796

(22) Filed: Aug. 24, 2023

(65) Prior Publication Data

US 2024/0069519 A1 Feb. 29, 2024

(30) Foreign Application Priority Data

Aug. 26, 2022 (JP) ................................ 2022-134784

(51) Int. Cl.
*G05B 19/4063* (2006.01)

(52) U.S. Cl.
CPC .................... *G05B 19/4063* (2013.01); *G05B 2219/31455* (2013.01); *G05B 2219/32373* (2013.01); *G05B 2219/45031* (2013.01)

(58) Field of Classification Search
CPC .. G06N 20/00; G06N 3/0455; G05B 19/4063; G05B 2219/45031; G05B 2219/31455; G05B 2219/32373; Y02P 90/02
See application file for complete search history.

(56) References Cited

U.S. PATENT DOCUMENTS 9,454,733 B1 * 9/2016 Purpura ................. G06N 20/00
11,256,231 B2 * 2/2022 Crothers .......... G06Q 10/06311
11,899,793 B2 * 2/2024 Isoyama ............... G06F 21/566
(Continued)

FOREIGN PATENT DOCUMENTS

JP 2003022116 A 1/2003
JP 2019083309 A 5/2019
(Continued)

OTHER PUBLICATIONS

Office Action from related Japanese Appln. No. 2022-134784, dated Jul. 16, 2024. English translation attached. 12 pages.
(Continued)

*Primary Examiner* — An H Do
(74) *Attorney, Agent, or Firm* — Secant IP, PLLC; Edmund P. Pfleger

(57) ABSTRACT

An information processing device of the present invention includes a first acquisition unit, a second acquisition unit, and a machine learning processing unit. The first acquisition unit acquires total event status information. The second acquisition unit acquires time-series detection result information. The machine learning processing unit performs one or both of learning processing and determination processing. In the learning processing, a learning model is generated by performing machine learning with the time-series detection result information acquired by the second acquisition unit as an input for each piece of the total event status information acquired by the first acquisition unit. In the determination processing, a determination is performed on the generated learning model by inputting the time-series detection result information acquired by the second acquisition unit for each piece of the total event status information acquired by the first acquisition unit.

6 Claims, 18 Drawing Sheets

(56) References Cited

U.S. PATENT DOCUMENTS

| | | | |
|---|---|---|---|
| 2008/0175693 | A1 | 7/2008 | Fujii |
| 2011/0125331 | A1 | 5/2011 | Fujii |
| 2012/0103793 | A1 | 5/2012 | Fujii |
| 2021/0209413 | A1 | 7/2021 | Nakago et al. |

FOREIGN PATENT DOCUMENTS

| | | | |
|---|---|---|---|
| JP | 2020170411 | A | 10/2020 |
| JP | 2022052351 | A | 4/2022 |
| TW | 201202876 | A1 | 1/2012 |
| TW | 202138943 | A | 10/2021 |
| WO | 2002061514 | A1 | 8/2002 |
| WO | 2006137476 | A1 | 12/2006 |
| WO | 2010010688 | A1 | 1/2010 |
| WO | 2010150540 | A1 | 12/2010 |
| WO | 2020137593 | A1 | 2/2020 |

OTHER PUBLICATIONS

Office Action from related Taiwanese Appln. No. 112131813 dated Apr. 18, 2024. Partial English translation attached. 14 pages.

* cited by examiner

| TIME | PROCESSING CHAMBER | TASK NAME | DEVICE | OPERATION |
|---|---|---|---|---|
| 0:00:01.7 | CHAMBER 3 | MAINV | OPEN | START |
| 0:00:02.6 | CHAMBER B | LIFTER | DOWN | START |
| 0:00:03.4 | CHAMBER 3 | MAINV | OPEN | COMPLETE |
| 0:00:03.4 | CHAMBER 3 | MFC1 MVC | ON | START |
| 0:00:03.4 | CHAMBER 3 | MFC1 MVC | ON | COMPLETE |
| 0:00:03.4 | CHAMBER 3 | MFC2 MVC | ON | AUTO EXIT |
| 0:00:03.4 | CHAMBER 3 | MFC3 MVC | ON | AUTO EXIT |
| 0:00:03.4 | CHAMBER 3 | MFC4 MVC | ON | START |
| 0:00:03.4 | CHAMBER 3 | MFC4 MVC | ON | COMPLETE |
| 0:00:03.5 | CHAMBER 3 | GAS1 INLETV | CLOSE | START |
| 0:00:03.5 | CHAMBER 3 | GAS1 INLETV | CLOSE | COMPLETE |
| 0:00:03.5 | CHAMBER 3 | GAS2 INLETV | CLOSE | AUTO EXIT |
| 0:00:03.5 | CHAMBER 3 | GAS3 INLETV | CLOSE | AUTO EXIT |
| 0:00:03.5 | CHAMBER 3 | GAS4 INLETV | CLOSE | AUTO EXIT |
| 0:00:03.6 | CHAMBER 3 | RF1 PS | OFF | AUTO EXIT |
| 0:00:03.6 | CHAMBER 3 | RF2 PS | OFF | AUTO EXIT |
| 0:00:05.8 | CHAMBER B | LIFTER | DOWN | COMPLETE |
| 0:00:18.6 | CHAMBER 3 | PRCS TRIGGER | OFF | AUTO EXIT |
| 0:00:18.6 | CHAMBER 3 | MFC1 MVC | ON | AUTO EXIT |
| 0:00:18.6 | CHAMBER 3 | MFC2 MVC | ON | AUTO EXIT |
| 0:00:18.6 | CHAMBER 3 | MFC3 MVC | ON | AUTO EXIT |
| 0:00:18.6 | CHAMBER 3 | MFC4 MVC | ON | START |
| 0:00:18.6 | CHAMBER 3 | MFC4 MVC | ON | COMPLETE |
| 0:00:18.7 | CHAMBER 3 | GAS1 INLETV | CLOSE | AUTO EXIT |

Figure 5:
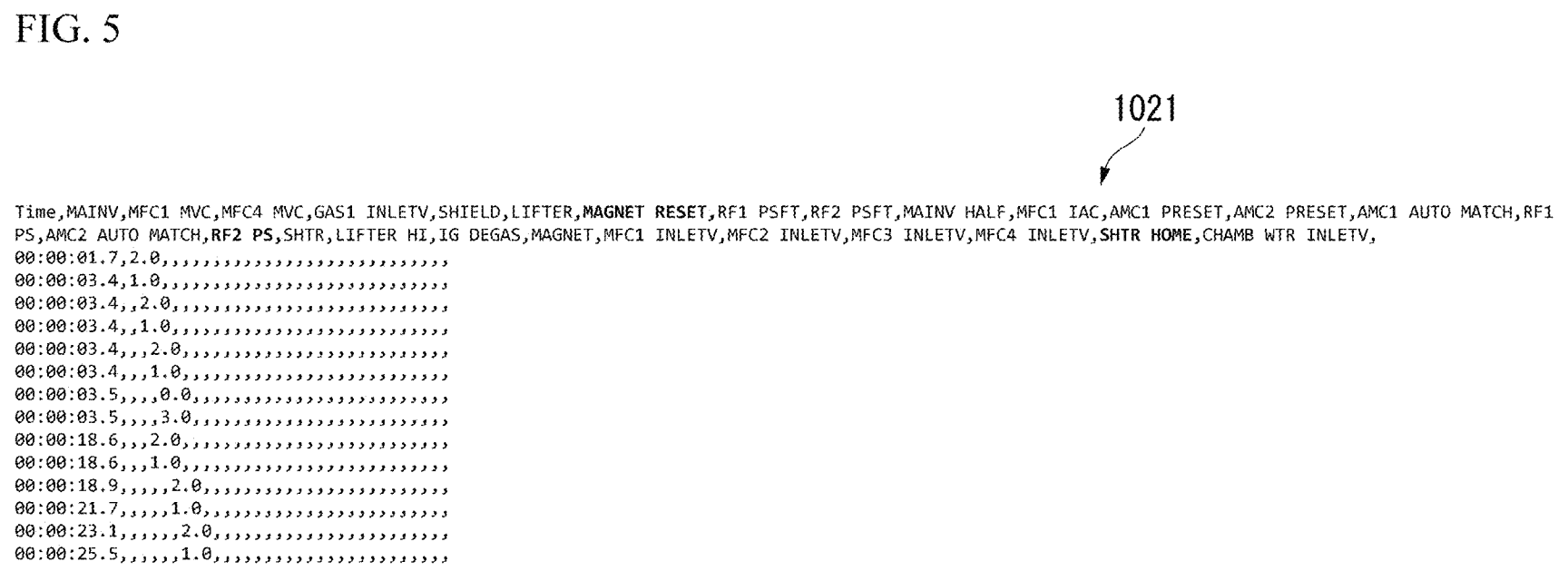

Time,MAINV,MFC1 MVC,MFC4 MVC,GAS1 INLETV,SHIELD,LIFTER,MAGNET RESET,RF1 PSFT,RF2 PSFT,MAINV HALF,MFC1 IAC,AMC1 PRESET,AMC2 PRESET,AMC1 AUTO MATCH,RF1 PS,AMC2 AUTO MATCH,RF2 PS,SHTR,LIFTER HI,IG DEGAS,MAGNET,MFC1 INLETV,MFC2 INLETV,MFC3 INLETV,MFC4 INLETV,SHTR HOME,CHAMB WTR INLETV,<br>
00:00:01.7,2.0,,,,,,,,,,,,,,,,,,,,,,,,,,,,<br>
00:00:03.4,1.0,,,,,,,,,,,,,,,,,,,,,,,,,,,,<br>
00:00:03.4,,2.0,,,,,,,,,,,,,,,,,,,,,,,,,,,<br>
00:00:03.4,,1.0,,,,,,,,,,,,,,,,,,,,,,,,,,,<br>
00:00:03.4,,,2.0,,,,,,,,,,,,,,,,,,,,,,,,,,<br>
00:00:03.4,,,1.0,,,,,,,,,,,,,,,,,,,,,,,,,,<br>
00:00:03.5,,,,0.0,,,,,,,,,,,,,,,,,,,,,,,,,<br>
00:00:03.5,,,,3.0,,,,,,,,,,,,,,,,,,,,,,,,,<br>
00:00:18.6,,,2.0,,,,,,,,,,,,,,,,,,,,,,,,,,<br>
00:00:18.6,,,1.0,,,,,,,,,,,,,,,,,,,,,,,,,,<br>
00:00:18.9,,,,,2.0,,,,,,,,,,,,,,,,,,,,,,,,<br>
00:00:21.7,,,,,1.0,,,,,,,,,,,,,,,,,,,,,,,,<br>
00:00:23.1,,,,,,2.0,,,,,,,,,,,,,,,,,,,,,,,<br>
00:00:25.5,,,,,,1.0,,,,,,,,,,,,,,,,,,,,,,, FIG. 7A
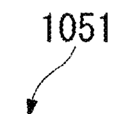
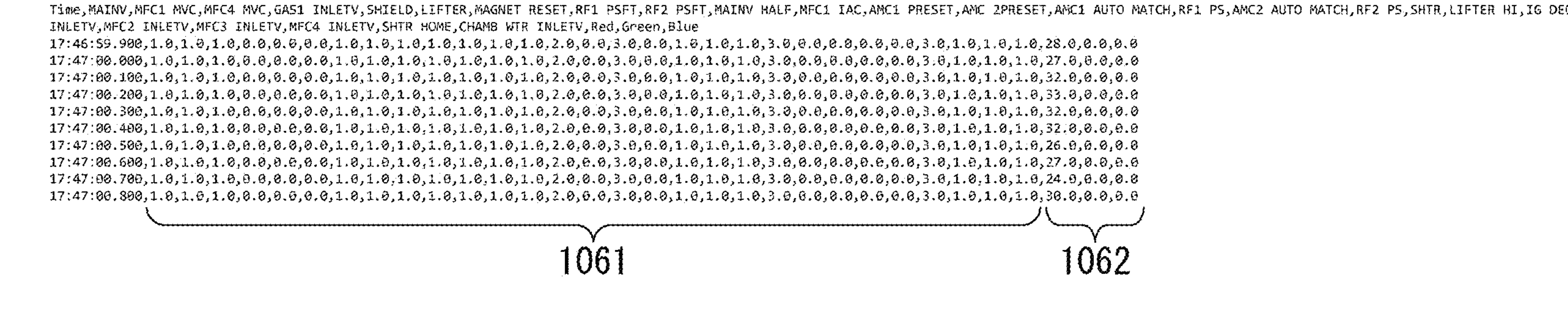
```
Time,MAINV,MFC1 MVC,MFC4 MVC,GAS1 INLETV,SHIELD,LIFTER,MAGNET RESET,RF1 PSFT,RF2 PSFT,MAINV HALF,MFC1 IAC,AMC1 PRESET,AMC 2PRESET,AMC1 AUTO MATCH,RF1 PS,AMC2 AUTO MATCH,RF2 PS,SHTR,LIFTER HI,IG DEGAS,MAGNET,MFC1
INLETV,MFC2 INLETV,MFC3 INLETV,MFC4 INLETV,SHTR HOME,CHAMB WTR INLETV,Red,Green,Blue
17:46:59.900,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,28.0,0.0,0.0
17:47:00.000,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,27.0,0.0,0.0
17:47:00.100,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,32.0,0.0,0.0
17:47:00.200,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,33.0,0.0,0.0
17:47:00.300,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,32.0,0.0,0.0
17:47:00.400,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,32.0,0.0,0.0
17:47:00.500,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,26.0,0.0,0.0
17:47:00.600,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,27.0,0.0,0.0
17:47:00.700,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,24.0,0.0,0.0
17:47:00.800,1.0,1.0,1.0,0.0,0.0,0.0,1.0,1.0,1.0,1.0,1.0,1.0,1.0,2.0,0.0,3.0,0.0,1.0,1.0,1.0,3.0,0.0,0.0,0.0,0.0,3.0,1.0,1.0,1.0,30.0,0.0,0.0
```
FIG. 7B
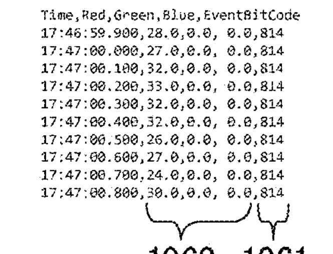
```
Time,Red,Green,Blue,EventBitCode
17:46:59.900,28.0,0.0, 0.0,814
17:47:00.000,27.0,0.0, 0.0,814
17:47:00.100,32.0,0.0, 0.0,814
17:47:00.200,33.0,0.0, 0.0,814
17:47:00.300,32.0,0.0, 0.0,814
17:47:00.400,32.0,0.0, 0.0,814
17:47:00.500,26.0,0.0, 0.0,814
17:47:00.600,27.0,0.0, 0.0,814
17:47:00.700,24.0,0.0, 0.0,814
17:47:00.800,30.0,0.0, 0.0,814
```

1211
1231
1232
1233
1261
1262
1263
GAS (FLOW RATE[sccm])
70 60 50 40 30 20 10 0
Heater Temp (TEMPERATURE[Cel])
450.4 450.2 450 449.8 449.6 449.4 449.2
Processing
Shield
Lifter
MAGNET RESET
GAS1 INLETV
MFC1 IAC
PRCS1 PS
GAS2 INLETV
MFC2 IAC
DOWN
DOWN
ON
OPEN
ON
ON
OPEN
ON
CLOSE
OFF
0 20 40 60 80 100 120 140
TIME (SEC)

Figure 12:
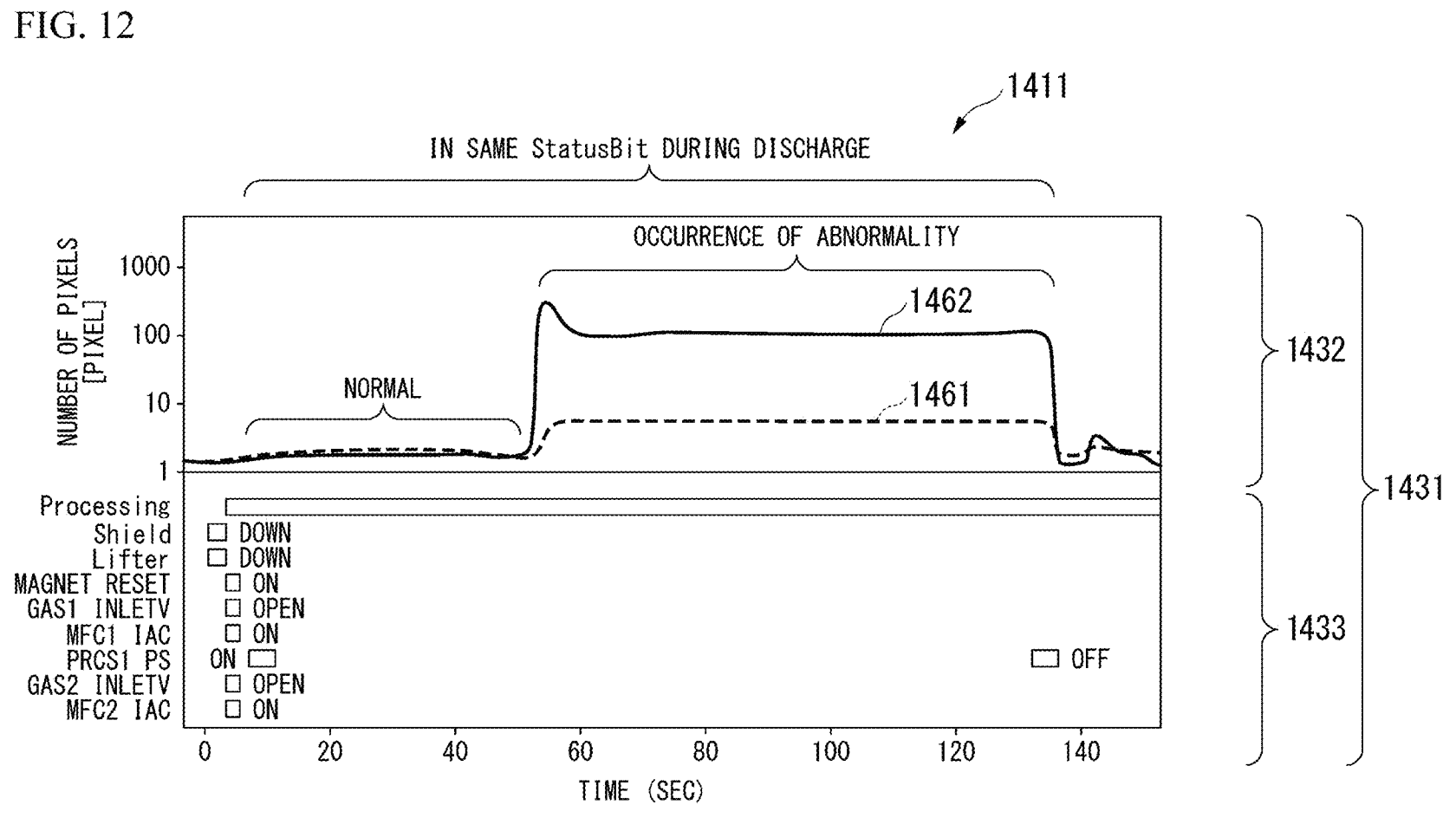

IN SAME StatusBit DURING DISCHARGE

OCCURRENCE OF ABNORMALITY

NORMAL

1462

1461

1431

1432

1433

NUMBER OF PIXELS [PIXEL]

1000
100
10
1

Processing
Shield DOWN
Lifter DOWN
MAGNET RESET ON
GAS1 INLETV OPEN
MFC1 IAC ON
PRCS1 PS ON
GAS2 INLETV OPEN
MFC2 IAC ON

OFF 0 20 40 60 80 100 120 140

TIME (SEC)

| | CarrierID | LotID | Cjob | Pjob | TIME | |
|---|---|---|---|---|---|---|
| | | | | | Start | End |
| Filter | | | | | 11:00 | 19:00 |

| | No. | CarrierID | LotID | Cjob | Pjob | TIME | |
|---|---|---|---|---|---|---|---|
| | | | | | | Start | End |
| ☑ | 6 | nnnnxxxx123 | 111111 | CJ20005000 | PJ55667788 | 18:00 | 18:50 |
| ☐ | 5 | nnnnxxxx124 | 222222 | CJ20005001 | PJ55667789 | 17:00 | 17:50 |
| ☒ | 4 | nnnnxxxx125 | 333333 | CJ20005002 | PJ55667790 | 16:00 | 16:50 |
| ☐ | 3 | nnnnxxxx126 | 444444 | CJ20005003 | PJ55667791 | 15:00 | 15:50 |
| ☐ | 2 | nnnnxxxx127 | 555555 | CJ20005004 | PJ55667792 | 14:00 | 14:50 |
| ☐ | 1 | nnnnxxxx128 | 666666 | CJ20005005 | PJ55667793 | 13:00 | 13:50 |

| | | | ☑ | ☐ | ☐ | ☐ | ☐ | ☐ |
|---|---|---|---|---|---|---|---|---|
| | Slot | Flow | Module1:SeqNo. | Module2:SeqNo. | Module3:SeqNo. | Module4:SeqNo. | Module5:SeqNo. | Module6:SeqNo. |
| ☑ | 1 | 4 | A:001 | B:001 | C:002 | | | |
| ☐ | 2 | 4 | A:001 | B:001 | C:002 | | | |
| ☒ | 3 | 4 | A:001 | B:001 | C:002 | | | |

FIG. 20A

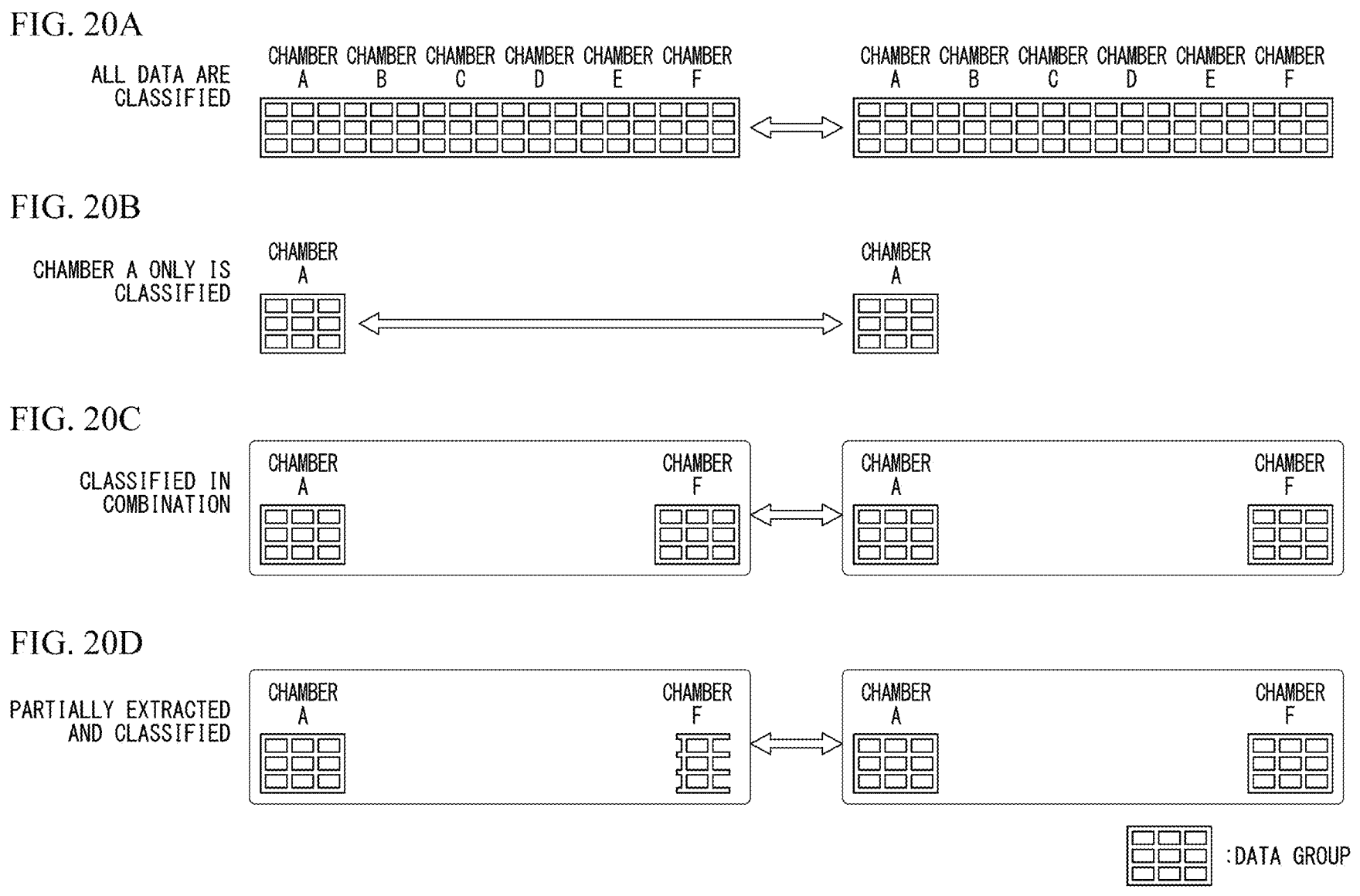

ALL DATA ARE CLASSIFIED

CHAMBER A CHAMBER B CHAMBER C CHAMBER D CHAMBER E CHAMBER F

CHAMBER A CHAMBER B CHAMBER C CHAMBER D CHAMBER E CHAMBER F

FIG. 20B

CHAMBER A ONLY IS CLASSIFIED

CHAMBER A

CHAMBER A

FIG. 20C

CLASSIFIED IN COMBINATION

CHAMBER A CHAMBER F

CHAMBER A CHAMBER F

FIG. 20D

PARTIALLY EXTRACTED AND CLASSIFIED

CHAMBER A CHAMBER F

CHAMBER A CHAMBER F

:DATA GROUP

INFORMATION PROCESSING DEVICE AND INFORMATION PROCESSING METHOD

CROSS-REFERENCE TO RELATED APPLICATION

Priority is claimed on Japanese Patent Application No. 2022-134784 filed on Aug. 26, 2022, the content of which is incorporated herein by reference.

BACKGROUND OF THE INVENTION

Field of the Invention

The present disclosure relates to an information processing device and an information processing method.

Description of Related Art

An object manufacturing apparatus configured to manufacture an object by controlling the status of a plurality of devices is known.

For example, a semiconductor manufacturing apparatus, which is an example of the object manufacturing apparatus, includes a plurality of devices to manufacture a semiconductor serving as an object. In manufacturing such a semiconductor, the semiconductor is manufactured by controlling the status of each of the plurality of devices. Also, in the semiconductor manufacturing apparatus, it is possible to acquire time-series data such as sounds, images, and vibrations in a manufacturing process of manufacturing the semiconductor.

For example, PCT International Publication No. WO 2010/010688 discloses an operation monitoring system for monitoring a processing apparatus. The processing apparatus includes a plurality of movable parts and a controller for controlling an operation of each of the plurality of movable parts. The plurality of movable parts are provided in the processing apparatus to form a predetermined processing environment inside a processing chamber that performs predetermined processing on an object to be processed. Such an operation monitoring system includes a vibration detection unit detecting a waveform of vibration generated according to the operation of each of the plurality of movable parts. When a control is performed by the controller to operate any of the plurality of movable parts, the operation monitoring system acquires event data according to the control of the controller and waveforms of vibrations of all the movable parts detected by the vibration detection unit and operating at that time.

Then, such an operation monitoring system monitors a change in the waveform each time a control according to the event data is selected, or when a waveform of vibration according to other event data of the same type as the event data is acquired. The operation monitoring system is configured to determine an abnormality of the processing apparatus if the waveform changes beyond a predetermined range.

However, there have been cases in which the status of a plurality of devices in a semiconductor manufacturing apparatus is not easy to represent in a conventional technology.

Particularly, when machine learning is applied to time-series data such as sounds, images, and vibrations, there have been cases in which selection of teacher data in machine learning is not easy unless representation of the status of the plurality of devices is easy.

SUMMARY OF THE INVENTION

The present invention has been made in consideration of such circumstances, and an objective of the present invention is to provide an information processing device and an information processing method capable of increasing efficiency of machine learning processing related to time-series detection result information detected in a manufacturing process of manufacturing an object by an object manufacturing apparatus for the object manufacturing apparatus manufacturing the object by operating each of a plurality of devices for each event.

An information processing device according to one aspect of the present invention includes: a first acquisition unit configured to acquire total event status information obtained by synthesizing event status information representing a status of an event of each of a plurality of devices for two or more devices for an object manufacturing apparatus, the object manufacturing apparatus being configured to manufacture an object by operating each of the plurality of devices for each event; a second acquisition unit configured to acquire time-series detection result information detected in a manufacturing process of manufacturing the object by the object manufacturing apparatus; and a machine learning processing unit configured to perform one or both of learning processing and determination processing, the learning processing being to generate a learning model by performing machine learning with the time-series detection result information acquired by the second acquisition unit as an input for each piece of the total event status information acquired by the first acquisition unit, the determination processing being to perform a determination on the generated learning model by inputting the time-series detection result information acquired by the second acquisition unit for each piece of the total event status information acquired by the first acquisition unit.

In the information processing device according to one aspect of the present invention, the total event status information may include a bit value representing a status of an operation result of the event for each of the plurality of devices.

In the information processing device according to one aspect of the present invention, the total event status information may further include a bit value representing a status of the event during operation of each of the plurality devices.

In the information processing device according to one aspect of the present invention, the two or more devices having the event status information included in the total event status information may be devices which are a part of all the plurality of devices of the object manufacturing apparatus.

In the information processing device according to one aspect of the present invention, the machine learning processing unit may determine a period of the time-series detection result information to be subjected to the learning processing or the determination processing on the basis of any of lots, substrates, carriers, recipes, and processing chambers.

An information processing method according to one aspect of the present invention includes: acquiring, by a first acquisition unit, total event status information obtained by synthesizing event status information representing a status of an event of each of a plurality of devices for two or more devices for an object manufacturing apparatus, the object manufacturing apparatus being configured to manufacture an object by operating each of the plurality of devices for each event; acquiring, by a second acquisition unit, time-series detection result information detected in a manufacturing process of manufacturing the object by the object manufacturing apparatus; and performing, by a machine learning processing unit, one or both of learning processing and determination processing, the learning processing being to generate a learning model by performing machine learning with the time-series detection result information acquired by the second acquisition unit as an input for each piece of the total event status information acquired by the first acquisition unit, the determination processing being to perform a determination on the generated learning model by inputting the time-series detection result information acquired by the second acquisition unit for each piece of the total event status information acquired by the first acquisition unit.

Advantageous Effects of Invention

According to the information processing device and the information processing method according to the present invention, it is possible to increase efficiency of machine learning processing related to time-series detection result information detected in a manufacturing process of manufacturing an object by an object manufacturing apparatus for the object manufacturing apparatus manufacturing the object by operating each of a plurality of devices for each event.

BRIEF DESCRIPTION OF THE DRAWINGS

FIG. 4 is a diagram showing an example of a configuration of a log having event information according to the embodiment recorded therein.

FIG. 5 is a diagram showing an example of a configuration of a log before time-series detection result information is recorded according to the embodiment.

FIG. 7A is a diagram showing an example of a configuration of a log before some bits are compressed according to the embodiment.

FIG. 7B is a diagram showing an example of a configuration of a log after some bits are compressed according to the embodiment.

FIG. 12 is a diagram showing another example of a screen including detection result information according to the embodiment.

FIG. 13A is a diagram showing an example of a screen on which selection of a teacher data target for machine learning can be performed according to the embodiment.

FIG. 13B is a diagram showing an example of a screen on which selection of a teacher data target for the machine learning can be performed according to the embodiment.

FIG. 13C is a diagram showing an example of a screen on which selection of a teacher data target for the machine learning can be performed according to the embodiment.

FIG. 20A is a diagram showing an example of variation of a referencing method of data according to the embodiment.

FIG. 20B is a diagram showing an example of variation of a referencing method of data according to the embodiment.

FIG. 20C is a diagram showing an example of variation of a referencing method of data according to the embodiment.

FIG. 20D is a diagram showing an example of variation of a referencing method of data according to the embodiment.

DETAILED DESCRIPTION OF THE INVENTION

Hereinafter, embodiments of the present invention will be described with reference to the drawings.

[Information Processing System]

Figure 1:
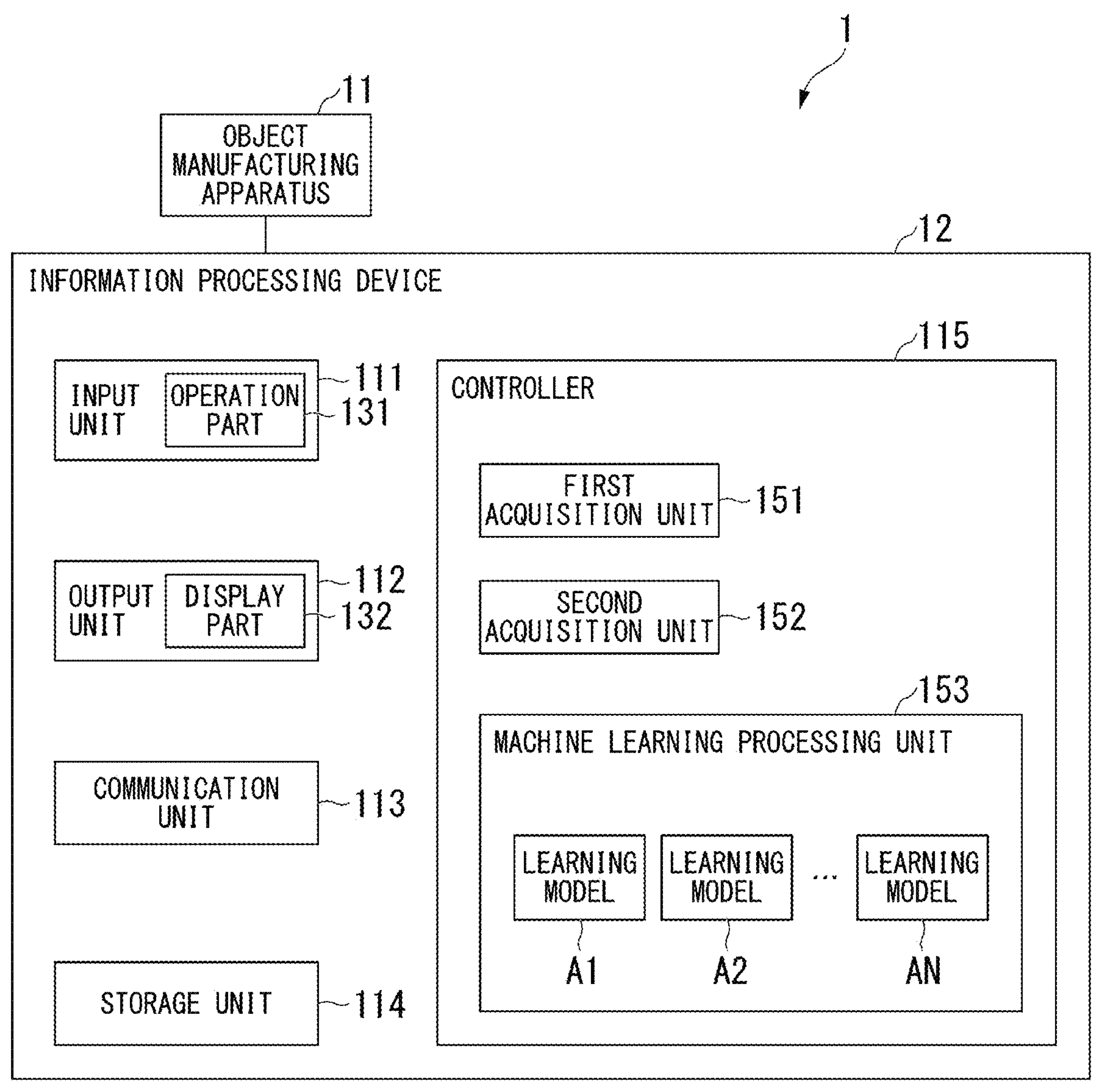
FIG. 1 is a diagram showing an example of a configuration of an information processing system according to an embodiment.

FIG. 1 is a diagram showing an example of a configuration of an information processing system 1 according to an embodiment.

The information processing system 1 includes an object manufacturing apparatus 11 and an information processing device 12.

<Information Processing Device>

The information processing device 12 is configured using, for example, a computer.

The information processing device 12 includes an input unit 111, an output unit 112, a communication unit 113, a storage unit 114, and a controller 115.

The input unit 111 has an operation part 131.

The output unit 112 has a display part 132.

The controller 115 includes a first acquisition unit 151, a second acquisition unit 152, and a machine learning processing unit 153.

The input unit 111 inputs information. For example, the operation part 131 receives and inputs information according to contents of an operation performed by a user.

The output unit 112 outputs information. For example, the display part 132 displays and outputs information to be displayed on a screen.

The communication unit 113 communicates with an external device. In the present embodiment, the external device is the object manufacturing apparatus 11.

The storage unit 114 stores information of various types.

The controller 115 performs controls and processing of various types.

The controller 115 includes a processor such as, for example, a central processing unit (CPU). The controller 115 executes a predetermined program by the processor to execute controls and processing of various types. The program may be stored in, for example, the storage unit 114.

The first acquisition unit 151 acquires total event status information (Event Status Bit).

In the present embodiment, the total event status information is information obtained by synthesizing event status information (bit for each event) representing a status of an event of each device included in the object manufacturing apparatus 11 for two or more devices.

Here, in the present embodiment, the object manufacturing apparatus 11 includes a plurality of devices. In the present embodiment, the status of the plurality of devices is represented using the total event status information.

In this way, the first acquisition unit 151 acquires the total event status information obtained by synthesizing the event status information representing a status of the event of each device for two or more devices for the object manufacturing apparatus 11 manufacturing an object by operating each of the plurality of devices for each event.

The total event status information includes a bit value representing a status of an operation result of the event for each device.

Also, the total event status information may further include a bit value representing a status of the event during operation for each device.

Also, as the total event status information, for example, information from which event status information has been deleted for one or more devices may also be used.

In this case, the two or more devices whose event status information is included in the total event status information are devices which are a part of all the devices included in the object manufacturing apparatus 11.

The second acquisition unit 152 acquires time-series detection result information.

Here, sensors for detecting physical quantities such as sounds, images (including light), and vibrations are provided in the object manufacturing apparatus 11. In the present embodiment, a plurality of sensors are provided in the object manufacturing apparatus 11. The time-series data of each physical quantity is detected by each of the sensors. In the present embodiment, the time-series data is also called detection result information for convenience of explanation.

In this way, the second acquisition unit 152 acquires the time-series detection result information detected in a manufacturing process of manufacturing the object by the object manufacturing apparatus 11.

The machine learning processing unit 153 holds a plurality (in the present embodiment, N) of learning models A1 to AN.

In the present embodiment, each of the learning models A1 to AN corresponds to a learning model for each piece of the total event status information. That is, in the present embodiment, machine learning processing is performed using different learning models for each piece of the total event status information.

Furthermore, the learning models A1 to AN are not held in the machine learning processing unit 153 before the machine learning is performed. When the machine learning is performed, the learning models A1 to AN are generated and held in the machine learning processing unit 153. Also, the learning models A1 to AN that has been generated in advance can be copied (that is, stored) to the object manufacturing apparatus 11 and used.

The machine learning processing unit 153 has a function of performing learning processing of generating the learning models A1 to AN by performing machine learning with the time-series detection result information acquired by the second acquisition unit 152 as an input for each piece of the total event status information acquired by the first acquisition unit 151.

Also, the machine learning processing unit 153 has a function of performing determination processing that performs a determination on the generated learning models A1 to AN by inputting the time-series detection result information acquired by the second acquisition unit 152 for each piece of the total event status information acquired by the first acquisition unit 151.

Furthermore, the function of performing the learning processing and the function of performing the determination processing may be provided in, for example, a different device.

Here, the machine learning processing unit 153 can determine, for example, a period of the time-series detection result information to be subjected to the learning processing or the determination processing on the basis of any of lots, substrates, carriers, recipes, and processing chambers.

<Outline of Machine Learning According to Embodiment>

In the present embodiment, an event represents a moment of an event recorded in a log (event log), or a record thereof.

Also, an event bit (event status information) represents information obtained by replacing the event with a bit signal according to a certain rule.

Also, an event bit code (total event status information) represents information obtained by aggregating the event bit into 32 bits, 64 bits, or the like.

Here, when all data of a certain processing chamber are processed by PCA (Principal Component Analysis) or the like according to an analysis by event bit code, it is also useful to display them with color coding or marker coding according to the event bit code.

In advancing automation, it is conceivable to record device status in a normal state with machine learning and determine an abnormality on the basis of a deviation from the learned contents in the normal state. Here, teacher data and appropriate preprocessing are important in establishing the machine learning.

Various events occur in an apparatus (the object manufacturing apparatus 11 in the present embodiment). Examples of the event include, for example, an event of actively moving a driving system, an event of indicating a timing that actually starts processing on a substrate, and the like.

The plurality of events described above are numbered.

As an example, if there are 32 events, there is a mode of representing a state thereof by a bit signal of 32 bits. Here, modes in which values indicated by the 32 bits are the same are determined to be the same state.

In such a mode, the bits of each event represent only a determined state of the operation.

As another example, for an operation event, a phase in the middle of the operation can also be represented using bits. As a specific example, in a case of an event called "Lifter Up," there are phases in the middle of the operation such as transitioning from a "Down" state to an "Up" state and reaching a completion state of "Up". In order to accommodate this, for example, it is possible to use two bits for one event such that bits of 00 represent the Down state, bits of 01 represent the Up state, bits of 10 represent transitioning from the Down state to another state, and bits of 11 represent transitioning from the Up state to another state. In this way, it is also possible to represent a state in operation using additional bits (for example, higher-order bits) with respect to the bits that simply represent the steady state (a state when not in operation). In this case, 64 bits are allocated for the 32 events.

In such a mode, the bits of each event represent a state in which the operation has been determined and a state in which the operation is changing.

In the present embodiment, when processing a status of one module of one apparatus is represented as a set of event bits (total event status information) using such representation of bits, basically if the same processing is repeated, an operation with the same total event status information is repeated. Further, various functional units may be used as the module.

In the information processing device 12, time-series data such as sounds, images, vibrations, or the like, which is other data (for example, analog data), is collected for each piece of the total event status information and is used as teacher data in performing learning for each piece of the total event status information, thereby generating the machine learning models (learning models A1 to AN). Further, it is assumed that, for example, the teacher data being data in a normal state (such as processing data when the object manufacturing processing has been completed normally) has already been confirmed by, for example, a person or the like.

On the other hand, in the information processing device 12, in a determination mode using the machine learning models, for example, each piece of the total event status information is compared with the teacher data so that a change is monitored.

For example, a setting may be made such that a WARNING is output when variations in values of the teacher data reach twice the variations and an ERROR is output when variations in the values of the teacher data reach ten times the variations, and optimization may be performed by adjusting each of the numerical values while operating to some extent. Further, the numerical values such as twice and ten times are examples, and other numerical values may be used.

Furthermore, for example, an abnormality detection function of an autoencoder may be used as the function of outputting the warning or error.

Also, in the information processing device 12, processing of determining bits that do not cause a change in the value of the detection result information (or bits causing a change in the value is small) among the event bits (event status information) and ignoring the bits may be performed. Therefore, the number of bits of the event status bits (total event status information) can be reduced.

Such processing can also be realized by a program on the basis of, for example, a degree of coincidence (or a degree of change) of the detection result information according to the change of each bit.

Also, in the information processing device 12 according to the present embodiment, as a period during which the machine learning is performed, for example, a maintenance cycle of a module of the object manufacturing apparatus 11 may be set to one period (unit period). Further, if an amount of data to be processed increases significantly, it is preferable to learn by randomly sampling within the period.

Also, in the information processing device 12 according to the present embodiment, data for which an alarm has been activated is not used for the machine learning.

As an object to be subjected to the machine learning, a case in which the object is specified, for example, for processing one type of event bit in one substrate or one module is an example of a minimum unit, but the minimum unit is not necessarily limited thereto, and, for example, a period (time) to be subjected to the machine learning may be specified by designating a lot, a carrier, a recipe, a processing chamber, or the like. Also, a period (time) with a value of the data of the detection result information such as, for example, a period having a predetermined temperature or the like as a reference may also be specified as the minimum unit.

Also, using such a minimum unit as an object to be subjected to the machine learning, data obtained by combining a plurality of minimum units may be an object to be subjected to the machine learning.

In the present embodiment, the information processing device 12 uses the machine learning processing unit 153 to automatically extract data of a period of the same status numerical value (total event status information) from the time-series data, and perform the machine learning processing or the determination processing based on the machine learning results.

<Object Manufacturing Apparatus>

Figure 2:
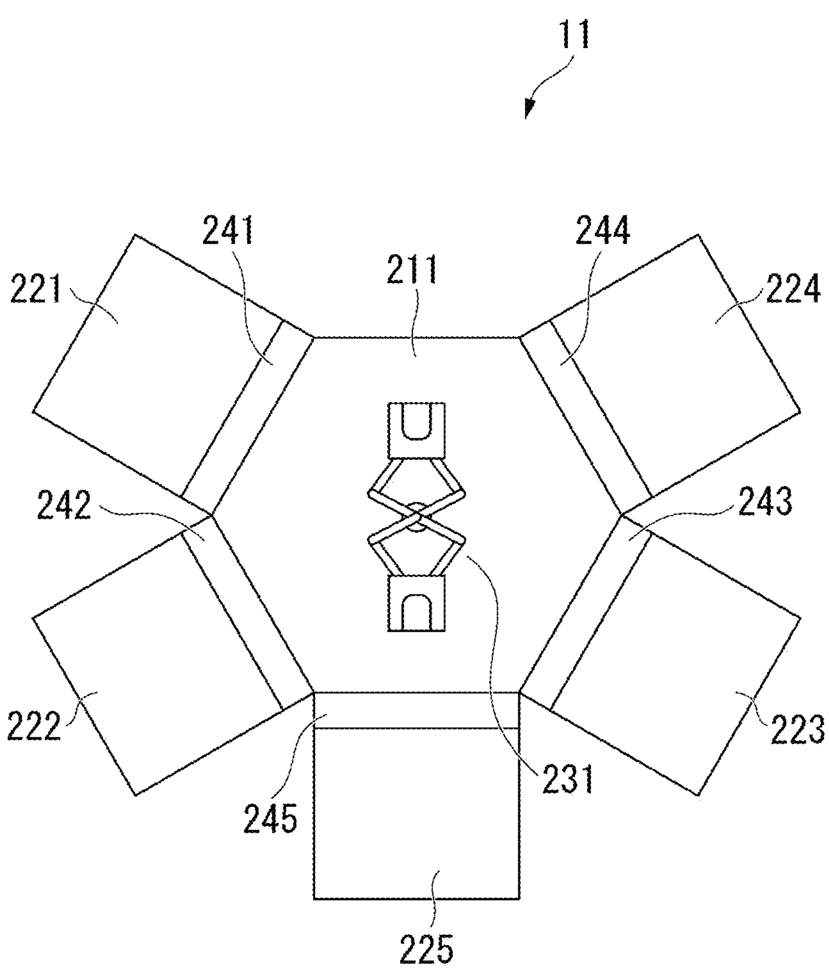
FIG. 2 is a view showing an example of a configuration of an object manufacturing apparatus according to the embodiment.

FIG. 2 is a view showing an example of a configuration of the object manufacturing apparatus 11 according to the embodiment.

Furthermore, the configuration example shown in FIG. 2 is partially similar to a configuration of the vacuum apparatus shown in FIG. 1 of PCT International Publication No. WO 2006/137476. In the present embodiment, detailed description of the configuration example will be omitted.

In the present embodiment, the object manufacturing apparatus 11 is a semiconductor manufacturing apparatus, and is a sputtering apparatus of a cluster tool.

The object manufacturing apparatus 11 includes a transfer chamber 211, a plurality of processing chambers 221 to 224, a load lock chamber 225, and partition valves 241 to 245.

The transfer chamber 211 includes a transfer robot 231 serving as a vacuum transfer robot.

The processing chambers 221 to 224 and the load lock chamber 225 are each connected to the transfer chamber 211.

The partition valves 241 to 245 are provided between the processing chambers 221 to 224 and the load lock chamber 225, and the transfer chamber 211, respectively.

The load lock chamber 225 is used to introduce a substrate from the atmosphere into a vacuum atmosphere.

As in the example shown in FIG. 2, the plurality of processing chambers 221 to 224 can be connected in the object manufacturing apparatus 11. The partition valves 241 to 244 are installed between the processing chambers 221 to 224 and the transfer chamber 211, respectively. Transfer of a substrate is performed after the partition valves 241 to 244 are opened and other transfer screens (screens other than a substrate) are moved. This movement is realized by, for example, raising and lowering an adhesion shield plate or raising and lowering a stage.

Figure 3A:
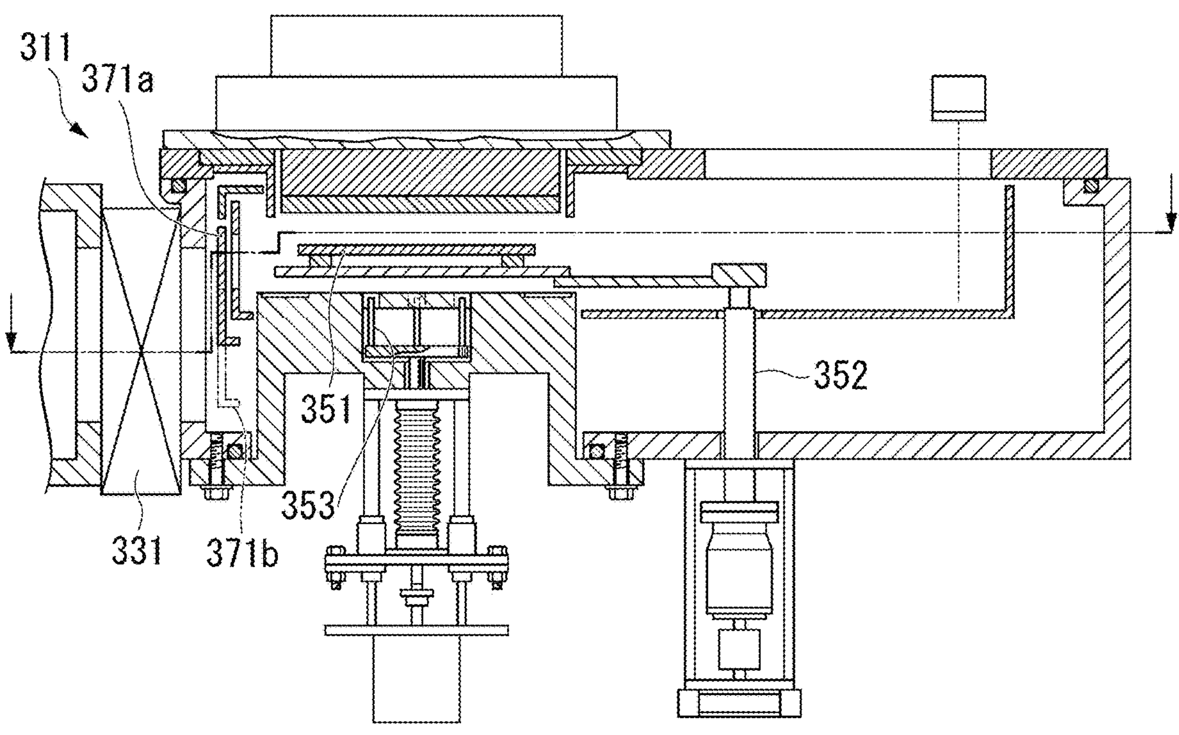
FIG. 3A is a view showing an example of a configuration of a processing chamber constituting the object manufacturing apparatus according to the embodiment.
Figure 3B:
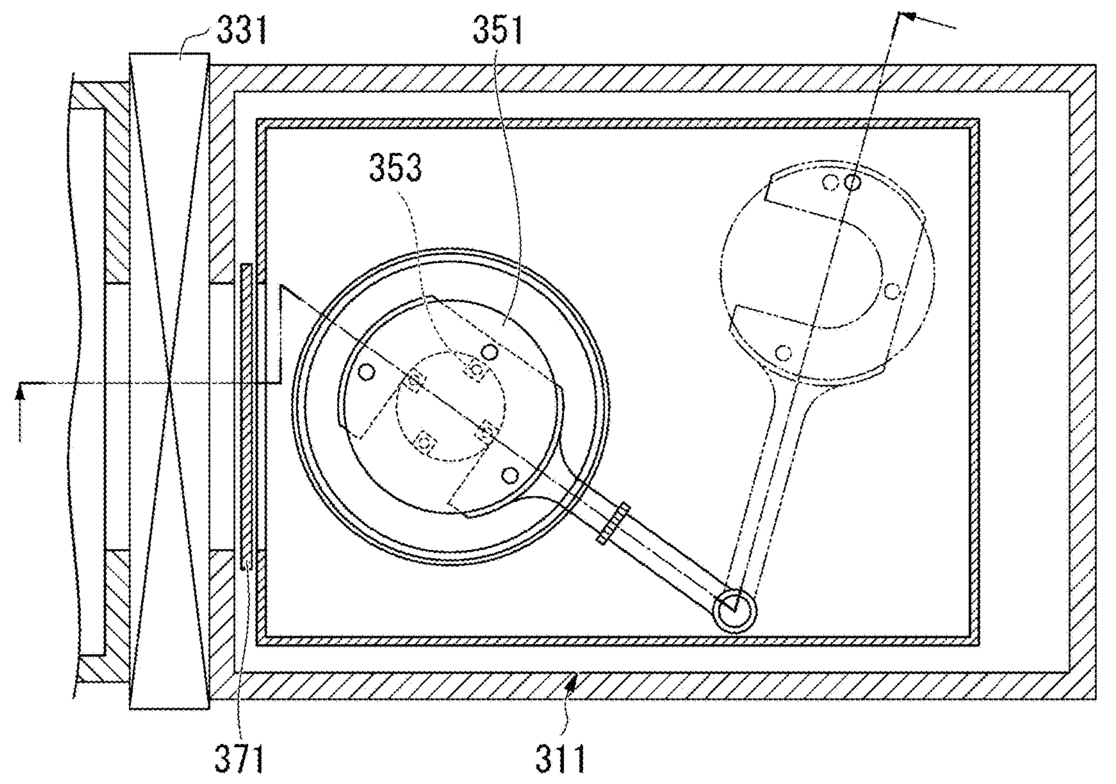
FIG. 3B is a view showing an example of a configuration of the processing chamber constituting the object manufacturing apparatus according to the embodiment.

FIGS. 3A and 3B are views showing an example of a configuration of a processing chamber 311 constituting the object manufacturing apparatus 11 according to the embodiment.

Furthermore, the configuration example shown in FIGS. 3A and 3B is similar to a configuration of the vacuum deposition apparatus shown in FIGS. 1 and 2 of PCT International Publication No. WO 2010/150540. In the present embodiment, detailed description of the configuration example is omitted, and an overview will be described.

Furthermore, the processing chamber 311 and a partition valve 331 shown in FIGS. 3A and 3B correspond to one of the plurality of processing chambers 221 to 224 and partition valves 241 to 244 in the example shown in FIG. 2.

FIG. 3A is a side cross-sectional view showing the processing chamber 311.

FIG. 3B is a planar cross-sectional view showing the processing chamber 311.

In FIGS. 3A and 3B, the partition valve 331, a shutter plate 351, a shutter mechanism 352, a lift pin 353 constituting a substrate lift mechanism, and an adhesion shield member 371 are shown as an outline for the processing chamber 311.

Here, the shutter plate 351 is a unit having a role as a cover that is used to protect the stage when a condition of the processing chamber 311 is improved by discharging.

In the example shown in FIGS. 3A and 3B, if the adhesion shield plate (shield) becomes a disturbance when the substrate is loaded into the processing chamber from the partition valve 331 side, the adhesion shield member 371 having a lift mechanism for the shield is lowered from a position indicated as an adhesion shield member 371*a* to a position indicated as an adhesion shield member 371*b*.

Furthermore, an example of an operation of the device included in the object manufacturing apparatus 11 has been shown here, but the object manufacturing apparatus 11 may include devices of various types, and an operation of each of the devices is appropriately controlled.

<Log Information>

Preprocessing of a log will be described.

FIG. 4 is a diagram showing an example of a configuration of a log 1011 having event information according to the embodiment recorded therein.

In the example shown in FIG. 4, as log information, information representing a time, a processing chamber, a task name, a device, and an operation are aligned in a horizontal direction and associated with each other. These pieces of information are aligned in a vertical direction in a time series.

Furthermore, terms used in the log will be described. Further, a configuration of the present example is an example, and is not necessarily limited thereto. Also, each of a plurality of objects whose operation is controlled such as, for example, a main exhaust valve and a gas flow rate controller is used as a device in the present embodiment.

"MAINV" represents a main exhaust valve. "MFC1 MVC" represents a gas flow rate controller 1. "MFC4 MVC" represents a gas flow rate controller 4. "GAS1 INLETV" represents a gas 1 supply side valve. "SHIELD" represents an operation of an adhesion shield plate up-and-down mechanism. "LIFTER" represents an operation between middle and lower stages of a three-stage substrate up-and-down mechanism. "MAGNET RESET" represents a magnetic reset. "RF1 PSFT" represents a phase shift operation of a high-frequency sputtering power supply 1. "RF2 PSFT" represents a phase shift operation of a high-frequency sputtering power supply 2. "MAINV HALF" represents a half of the main exhaust valve. "MFC1 IAC" represents an automatic control of MFC1. "AMC1 PRESET" represents a designated position moving operation of a matching controller of the high-frequency sputtering power supply 1. "AMC2 PRESET" represents a designated position moving operation of a matching controller of the high-frequency sputtering power supply 2. "AMC1 AUTO MATCH" represents a matching operation of the matching controller of the high-frequency sputtering power supply 1. "RF1 PS" represents an ON operation of the high-frequency sputtering power supply 1. "AMC2 AUTO MATCH" represents a matching operation of the matching controller of the high-frequency sputtering power supply 2. "RF2 PS" represents an ON operation of the high-frequency sputtering power supply 2. "SHTR" represents a close operation and an open operation of the shutter mechanism. "LIFTER HI" represents movement to an upper stage of the three-stage substrate up-and-down mechanism. "IG DEGAS" represents Degas processing of an ion gauge of a vacuum gauge. "MAGNET" represents a magnet rotation mechanism operation. "MFC1 INLETV" represents a processing chamber side valve of the gas flow rate controller 1. "MFC2 INLETV" represents a processing chamber side valve of a gas flow rate controller 2. "MFC3 INLETV" represents a processing chamber side valve of a gas flow rate controller 3. "MFC4 INLETV" represents s processing chamber side valve of a gas flow rate controller 4. "SHTR HOME" represents a shutter home operation. "CHAMB WTR INLETV" represents a chamber, cooling water, and a valve.

FIG. 5 is a diagram showing an example of a configuration of a log 1021 according to the embodiment before the time-series detection result information is recorded.

Figure 6:
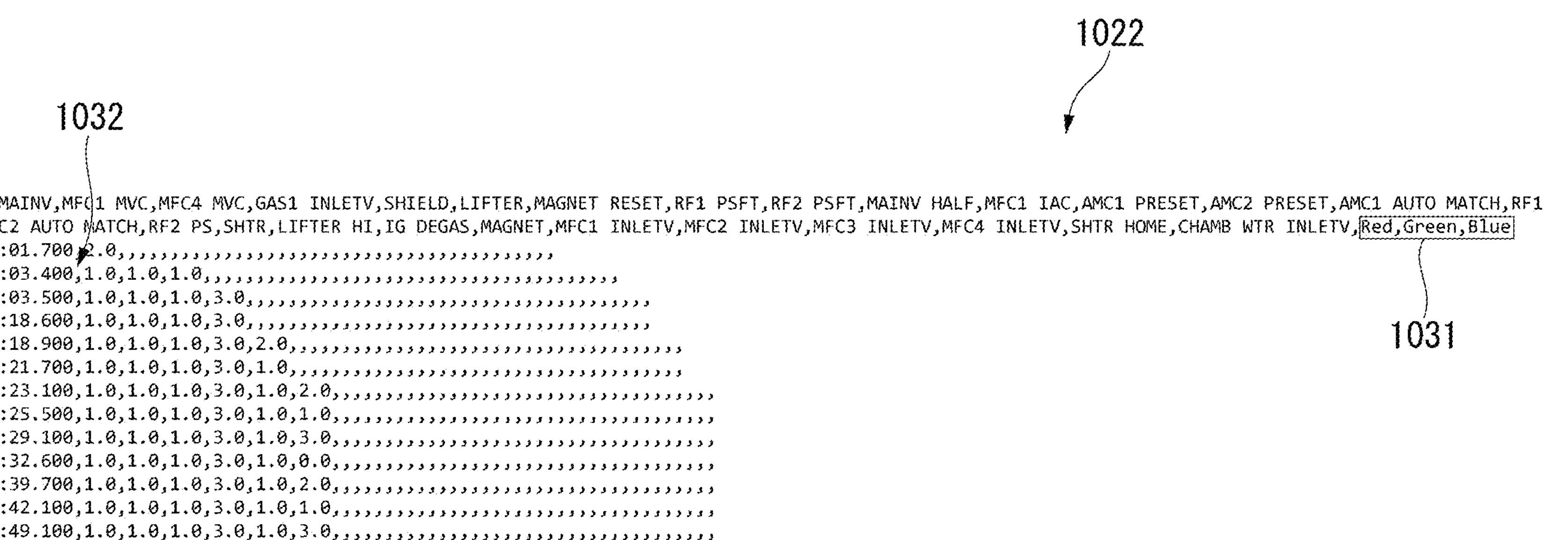
FIG. 6 is a diagram showing an example of a configuration of a log having the time-series detection result information according to the embodiment recorded therein.

FIG. 6 is a diagram showing an example of a configuration of a log 1022 according to the embodiment in which the time-series detection result information is recorded.

For the log 1021 shown in FIG. 5, rearrangement is performed in a time series, and status changes of the data with bits written in the columns indicating the devices are described and are filled so that the status is maintained until the next status change.

Also, the time-series detection result information (color data in the present example) is added as an item to the log 1021 shown in FIG. 5 in a column on a right side as indicated by an item portion 1031.

Specifically, items called "Red, Green, Blue" are added.

At that time, the information processing device 12 uses the controller 115 (for example, the machine learning processing unit 153) to add Time by rounding it off to a previously designed time granularity as indicated by the time part 1032. In the example shown in FIG. 5, time-series color data of a camera measured at a cycle of 0.033 sec (=30 Hz) is added to the time-series data in units of 0.1 sec.

Here, in the example shown in FIG. 6, since all items of numerical values (bits) of the total event status information are not filled, the total event status information is in an invalid time zone.

When time-series data is added to a time zone in which all items of the total event status information (bits) are filled, effective data is obtained.

FIG. 7A is a diagram showing an example of a configuration of a log 1051 before some bits are compressed.

FIG. 7B is a diagram showing an example of a configuration of a log 1052 after some bits are compressed.

In the example shown in FIG. 7A, rows with empty data are deleted. That is, rows in which devices of all types have operated to make all bits of the total event status information valid and time-series analog data has entered are extracted.

In the example shown in FIG. 7B, disposition of bits of a portion 1061 and bits of a portion 1062 shown in FIG. 7A is reversed left and right, and the bits of the portion 1061 are compressed and expressed as a column of the event bit code. In the present example, it has a decimal value after the compression, and is indicated as a portion 1061*a*.

Furthermore, such compression may not necessarily be performed.

Here, a specific example of a reduction method of bits will be described.

For example, in a module, event bits to be controlled are almost the same during discharge, and bits of substrate types depending on a product substrate and a dummy substrate are different. In such a case, in the information processing device 12, an item name of a certain bit and top five contribution rates of device data changes with respect to a change of the certain bit are displayed. Then, the information processing device 12 confirms the display items, the contribution rates, clusters resulting from dimension reduction to two dimensions, and items of top three contribution rates in each dimension, and reduction of the target bit is performed when there is no significant difference, or when it is determined that the difference is not important.

<Log Adjustment>

Figures 8A, 8B, 8C, 8D:
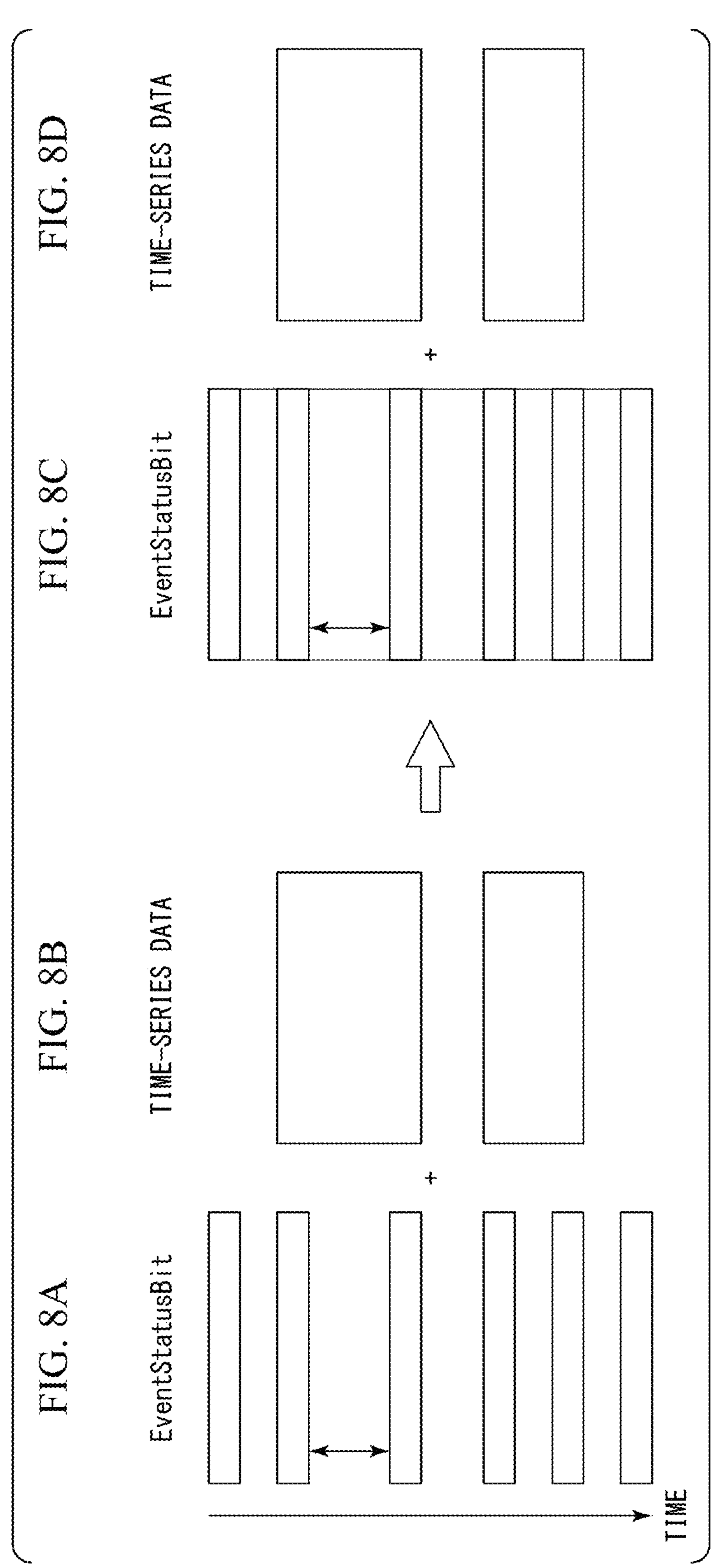
FIG. 8A is a diagram showing an example of total event status information before an adjustment according to the embodiment.
FIG. 8B is a diagram showing an example of time-series data before the adjustment according to the embodiment.
FIG. 8C is a diagram showing an example of the total event status information after the adjustment according to the embodiment.
FIG. 8D is a diagram showing an example of the time-series data after the adjustment according to the embodiment.

FIG. 8A is a diagram showing an example of total event status information (Event Status Bit) before an adjustment according to the embodiment.

FIG. 8B is a diagram showing an example of time-series data before the adjustment according to the embodiment.

FIG. 8C is a diagram showing an example of the total event status information (Event Status Bit) after the adjustment according to the embodiment.

FIG. 8D is a diagram showing an example of the time-series data after the adjustment according to the embodiment.

In FIGS. 8A to 8D, the vertical axis represents a time downward from above.

In the present embodiment, the information processing device 12 converts the data shown in FIGS. 8A and 8B into the data shown in FIGS. 8C and 8D by the controller 115 (for example, the machine learning processing unit 153).

In the example shown in FIG. 8A, since a status of the event may change irregularly, there is originally no data with a time stamp when the status is not changed.

In the example shown in FIG. 8B, the time-series data has data only for a time zone during which it is measured, but the data is periodically filled during the measurement period.

In the example shown in FIG. 8C, when the status does not change, the event remains in the same status until the next status change, and therefore intermediate data is filled with a copy of the same data (immediately preceding data). At that time, a period of time can be freely set.

In the example shown in FIG. 8D, the time-series data is in accordance with the same period as the time of the event. For example, 30 Hz (=0.033 sec) may be converted to 10 Hz (=0.1 sec).

<Example of Repetition of Event Bit>

Figure 9:
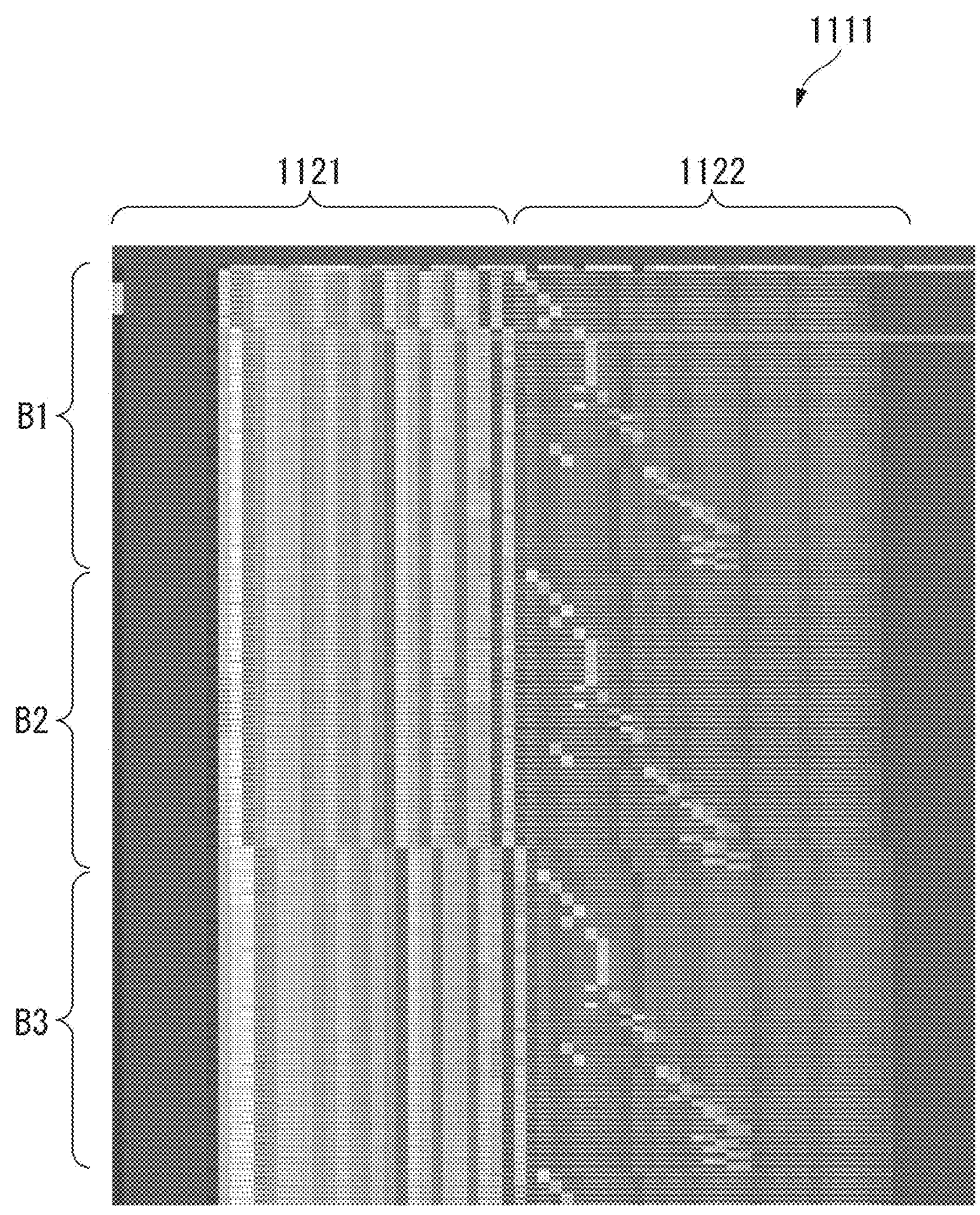
FIG. 9 is a diagram showing an example of repetition of event bits according to the embodiment.

FIG. 9 is a diagram showing an example of repetition of event bits according to the embodiment.

In FIG. 9, an example of a log 1111 is shown schematically.

The log 1111 includes a bit portion 1121 representing a time, a bit portion 1122 representing total event status information, and other bit portions.

The example shown in FIG. 9 shows a case in which the total event status information changes periodically with the elapse of time.

As shown in FIG. 9, the same total event status information is repeated for each periodic period (periods B1, B2, and B3) as time elapses. That is, for each periodic period (periods B1, B2, and B3), states of the status change of each event are the same.

Furthermore, the example shown in FIG. 9 is an example, and a mode in which the total event status information changes periodically may not necessarily be used.

[Example of Screen Including Detection Result Information]

Figure 10:
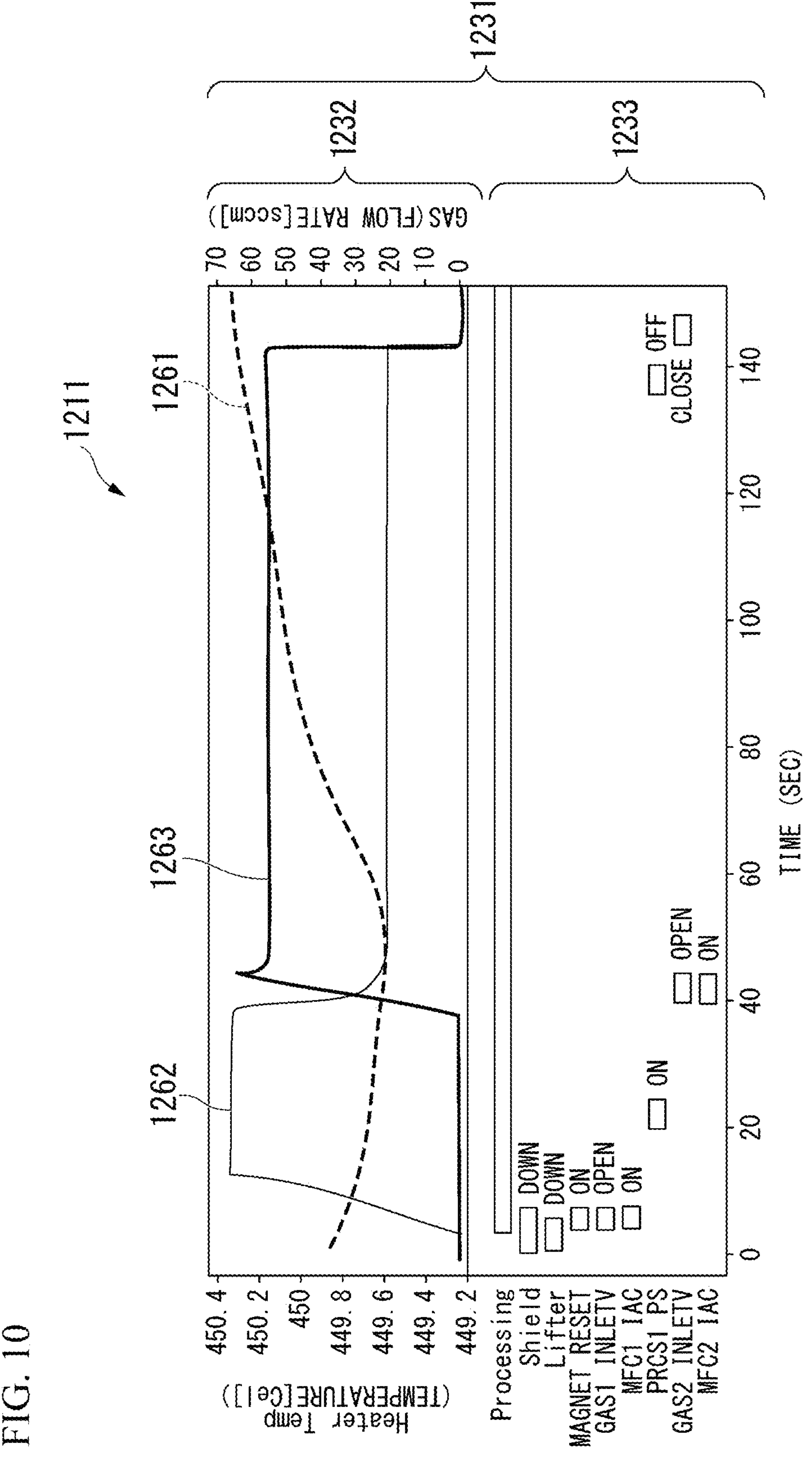
FIG. 10 is a diagram showing an example of a screen including detection result information according to the embodiment.

FIG. 10 is a diagram showing an example of a screen 1211 including detection result information according to the embodiment.

The screen 1211 includes a region 1231 representing data related to the detection result information, among which a region 1232 representing a graph of the detection result information and a region 1233 representing total event status information related to the detection result information are included.

Temperature data 1261, gas 1 data 1262, and another gas 2 data 1263 are included in the graph of the detection result information.

Events of the total event status information include a processing period (Processing), an operation of the adhesion shield plate (Shield), the substrate lift mechanism (Lifter), a magnetic circuit operation reset (MAGNET RESET), a valve operation of the gas 1 (GAS1 INLETV), a flow rate control of the gas 1 (MFC1 IAC), an operation of sputtering power supply (PRCS1 PS), a valve operation of the gas 2 (GAS2 INLETV), and a flow rate control of the gas 2 (MFC2 IAC).

Types of the detection result information include a flow rate of the gas 1 in the chamber (data 1262), a flow rate of the gas 2 in the chamber (data 1263), and a temperature of a heater (data 1261).

In the example shown in FIG. 10, data fluctuating in a time series is shown in an upper graph, and a Gantt chart of the device operation is shown in a lower graph.

In the example shown in FIG. 10, information obtained by digitizing the detection result information is displayed in the upper graph. In the example shown in FIG. 10, the detection result information is information on the temperature, the flow rate of the gas 1, and the flow rate of the gas 2, but other examples may be information on a camera image, vibration, and the like.

In the present embodiment, a state of the Gantt chart is converted into bits, and learning is performed separately for each bit (for each piece of the total event status information).

Figure 11:
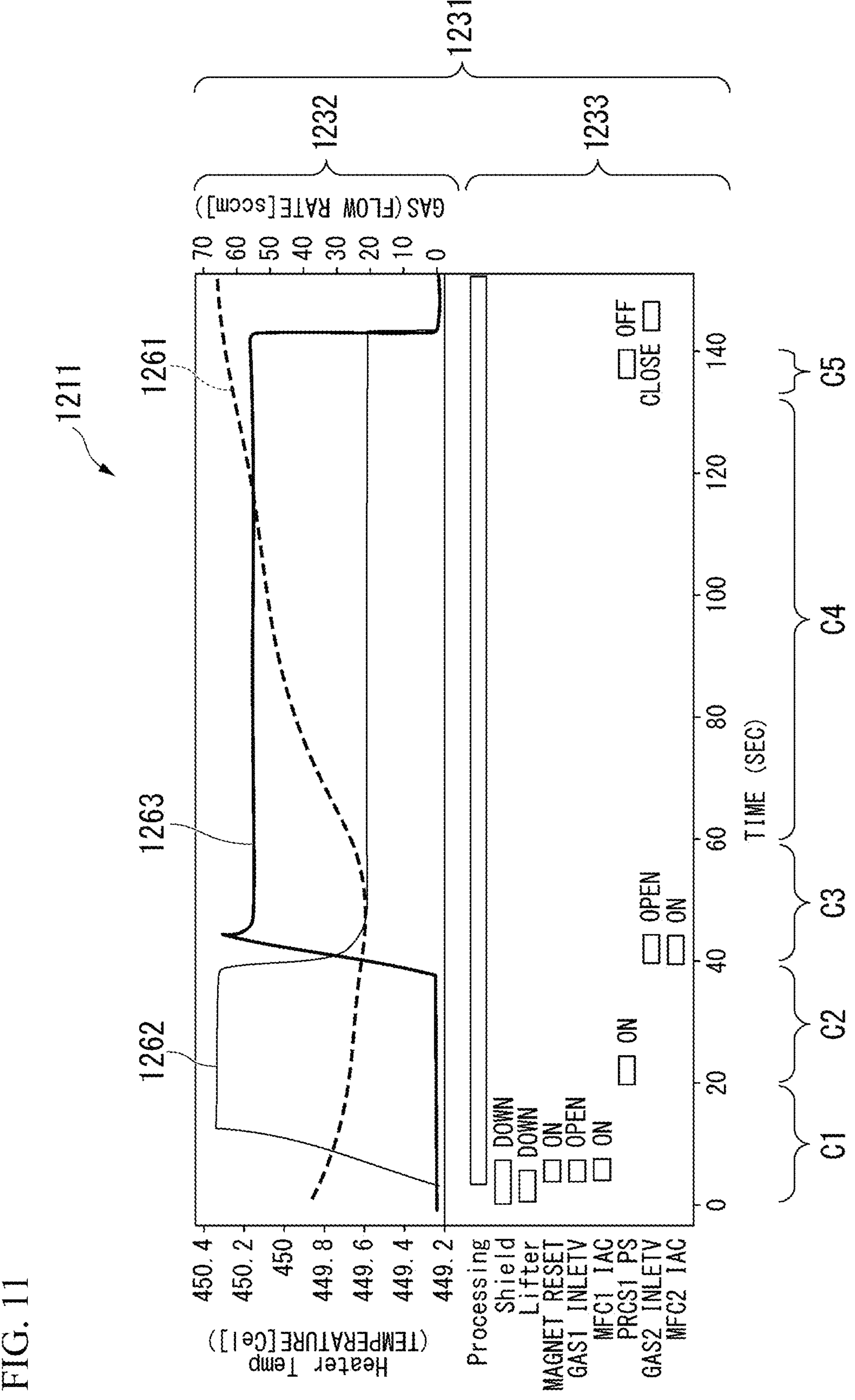
FIG. 11 is a diagram for explaining an example of learning of the detection result information according to the embodiment.

FIG. 11 is a diagram for explaining an example of learning of the detection result information according to the embodiment.

In FIG. 11, a period of machine learning will be described using the screen 1211 shown in FIG. 10.

That is, in the present embodiment, the machine learning processing unit 153 of the information processing device 12 does not collectively perform the machine learning for the entire period of the data of the detection result information, but performs the machine learning for each period (periods C1 to C5) in which states of the total event status information are the same. Here, the periods C1 to C5 are examples for explanation, and the period is not necessarily limited thereto.

Furthermore, if periods with the same state of the total event status information appear discretely, the machine learning may be performed by, for example, collecting information having the same state of the total event status information.

For one or more pieces of lot identification information (Lot ID), substrate identification information (Wafer ID), carrier identification information (Career ID), recipe identification information (Recipe ID) which is a name of processing, and processing chamber identification information, all of which is existing information, a configuration in which a time and series of the time-series data to be learned are selected from each processing time and target portion may be used.

In the present embodiment, in such a configuration, a condition of filtering using the total event status information is added. Therefore, the machine learning processing unit 153 of the information processing device 12 can perform condition filtering from the perspective of the total event status information, and can perform learning by, for example, automatically subdividing processing of the existing information (ID) on the basis of the total event status information.

As described above, the total event status information is suitable for the condition of filtering used when learning the time-series data.

FIG. 12 is a diagram showing another example of a screen 1411 including detection result information according to the embodiment.

The screen 1411 includes a region 1431 representing data related to the detection result information, among which a region 1432 representing a graph of the detection result information and a region 1433 representing the total event status information related to the detection result information are included.

For the example shown in FIG. 12, points that are different from the example shown in FIG. 10 will be described.

In the example shown in FIG. 12, data 1461 of a magenta color from the camera and data 1462 of a rose color from the camera are contained as the detection result information.

Types of the detection result information include a magenta color (light of the magenta color) from the camera and a rose color (light of the magenta color) from the camera.

The example shown in FIG. 12 indicates a range in which the total event status information is constant.

The data 1462 of the rose color from the camera indicates a case in which an abnormality occurs after a steady state.

Here, the example shown in FIG. 12 is a graph showing the number of pixels of each color in an image obtained by capturing an image of the inside of a module of the semiconductor manufacturing apparatus with the camera. In the present embodiment, learning can be automatically performed according to each state for values that change in various ways due to such events.

The data 1461 and 1462 shown in FIG. 12 are data obtained in the middle of discharging to the shutter plate after the shutter plate (the shutter plate 371 in the example of FIGS. 3A and 3B) is set on the stage. Discharge light varies periodically due to rotation of the magnetic circuit.

In the example shown in FIG. 12, a color of the discharge changes when an abnormality occurs.

[Teacher Data for Machine Learning]

Here, as a method for registering teacher data, a method optionally selected from known methods may be used.

For example, in the information processing device 12, a method of specifying a time zone optionally selected by a user's operation and registering data of the specified time zone in the teacher data may be used. As a reference for extracting the time, for example, a method of directly inputting a time may be used.

Also, for example, in the information processing device 12, a method of specifying various ID values (Lot ID, Carrier ID, and the like) related to processed lots by the user's operation, and registering data corresponding to the specified ID values in the teacher data may be used.

Also, for example, a method of further subdividing and specifying the ID of the substrate, the processing chamber, or the like to narrow down the teacher data may be used, or a method of specifying a plurality of IDs and narrowing down the teacher data may be used.

Also, for example, for data stored in a predetermined database, a method of specifying a condition of a data reference to specify a target time by the user's operation, and registering data at the specified target time in the teacher data may be used. As the condition, a condition such as, for example, when a stage temperature being (200±1) [° C.] may be used.

FIGS. 13A, 13B, and 13C are diagrams showing examples of screens on which selection of teacher data targets for the machine learning can be performed according to the embodiment.

Here, in the present embodiment, for convenience of explanation, each screen of FIGS. 13A, 13B, and 13C will be described separately, but, for example, two or three screen contents optionally selected from these plurality of screens may be displayed on one screen. Also, for display formats of these plurality of screens, a display format optionally selected from known display formats may be used.

FIG. 13A shows a screen 1511*a* on which selection of a teacher data target can be performed on the basis of a processing time by filtering with the processing time.

In the example shown in FIG. 13A, selection of the teacher data target can be performed on the basis of a time at the start of processing (Start), a time at the end of processing (End), or both of these.

FIG. 13B shows a screen 1511*b* on which selection of the teacher data target can be performed by selecting form past processing results (history).

In the example shown in FIG. 13B, data of the detection result information of "No. 4" and data of the detection result information of "No. 6" are selected as the teacher data targets for machine learning. In the example shown in FIG. 13B, carrier identification information (Career ID), lot identification information (Lot ID), control job identification information (Cjob), process job identification information (Pjob), processing start time, and processing end time are determined in each piece of the data.

FIG. 13C shows a screen 1511*c* on which selection of a teacher data target can be performed for each substrate (Wafer).

In the example shown in FIG. 13C, selection of a teacher data target is performed by selecting a processing chamber and a substrate to be registered. Specifically, "1" and "3" are selected as a slot (Slot), and "A:001" (Module 1:SeqNo.) is selected as a module (Module) and a sequence number (SeqNo.).

Furthermore, in the example shown in FIG. 13C, other modules can also be selected, and flow (Flow) information for processing the substrate is also displayed.

<Example of Determination by Device>

In the present embodiment, since the time-series data is learned for each total event status information, deterioration determination or the like for each device is facilitated.

For example, if there is an abnormality in a motor-driven isolation valve, a valve operation thereof becomes unstable. When the valve operation becomes unstable, a fluctuation range of a motor current value for the valve operation extends.

Figure 14:
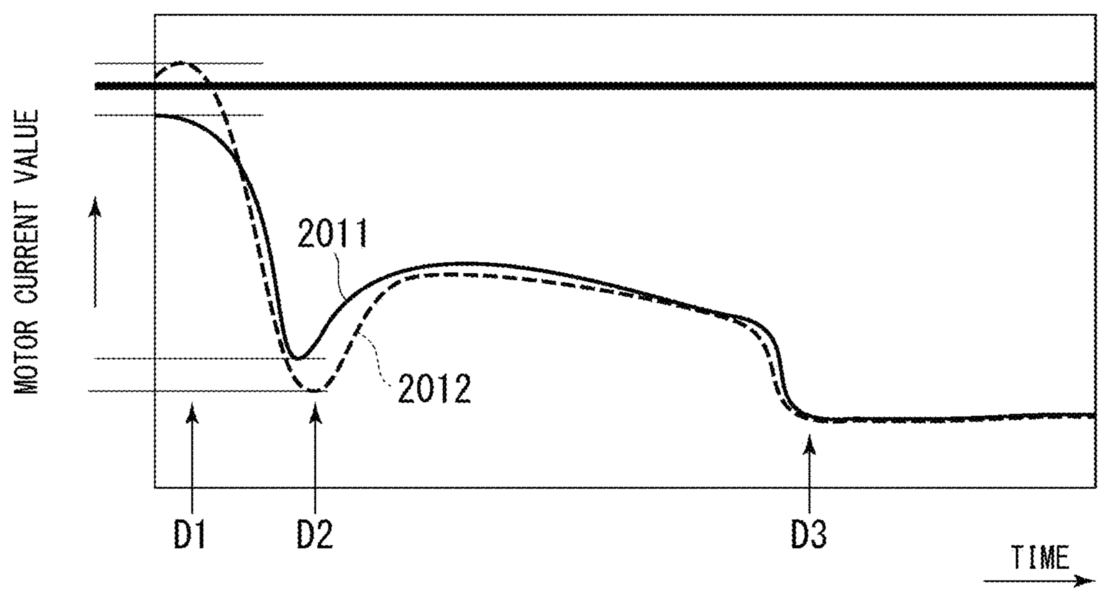
FIG. 14 is a diagram showing an example of data with a normal motor current value and data with an abnormal motor current value according to the embodiment.

FIG. 14 is a diagram showing an example of data 2011 with a normal motor current value and data 2012 with an abnormal motor current value according to the embodiment.

In the example shown in FIG. 14, a change point during operation of the isolation valve is indicated. Specifically, FIG. 14 shows an elapsed time and transition of a motor current value during an open operation of the isolation valve.

In the graph shown in FIG. 14, the horizontal axis represents the elapsed time (time), and the vertical axis represents the motor current value.

The data 2011 and the data 2012 are time-series data at the time of total event status information when the isolation valve is in the open operation.

Also, the example shown in FIG. 14 indicates a timing D1 of separation from a fixed state, a timing D2 of momentary current drop after the separation, and a timing D3 in which the isolation valve reaches an opening position and the position is held with a constant current.

Figure 15:
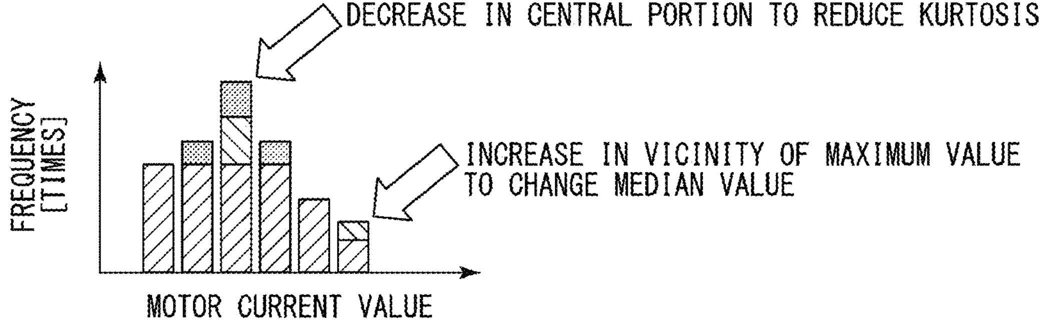
FIG. 15 is a diagram showing an example of a relationship between a motor current value and a frequency according to the embodiment.

FIG. 15 is a diagram showing an example of a relationship between a motor current value and a frequency according to the embodiment.

The example shown in FIG. 15 indicates a result obtained by calculating a statistical value for the motor current value in the period shown in FIG. 14.

In the graph shown in FIG. 15, the horizontal axis represents the motor current value, and the vertical axis represents the frequency [times].

FIG. 15 shows a histogram of the motor current value measured at intervals of 0.1 sec during the open operation of the isolation valve.

In the histogram, changes occur in maximum value, kurtosis, skewness, and median value between a normal state and an abnormal state. In the example shown in FIG. 15, when the normal state changes to the abnormal state, the frequency in a central portion decreases to reduce the kurtosis, and the frequency in a region in the vicinity of a maximum value increases to change the median value.

[Example of Machine Learning Result]

Figure 16:
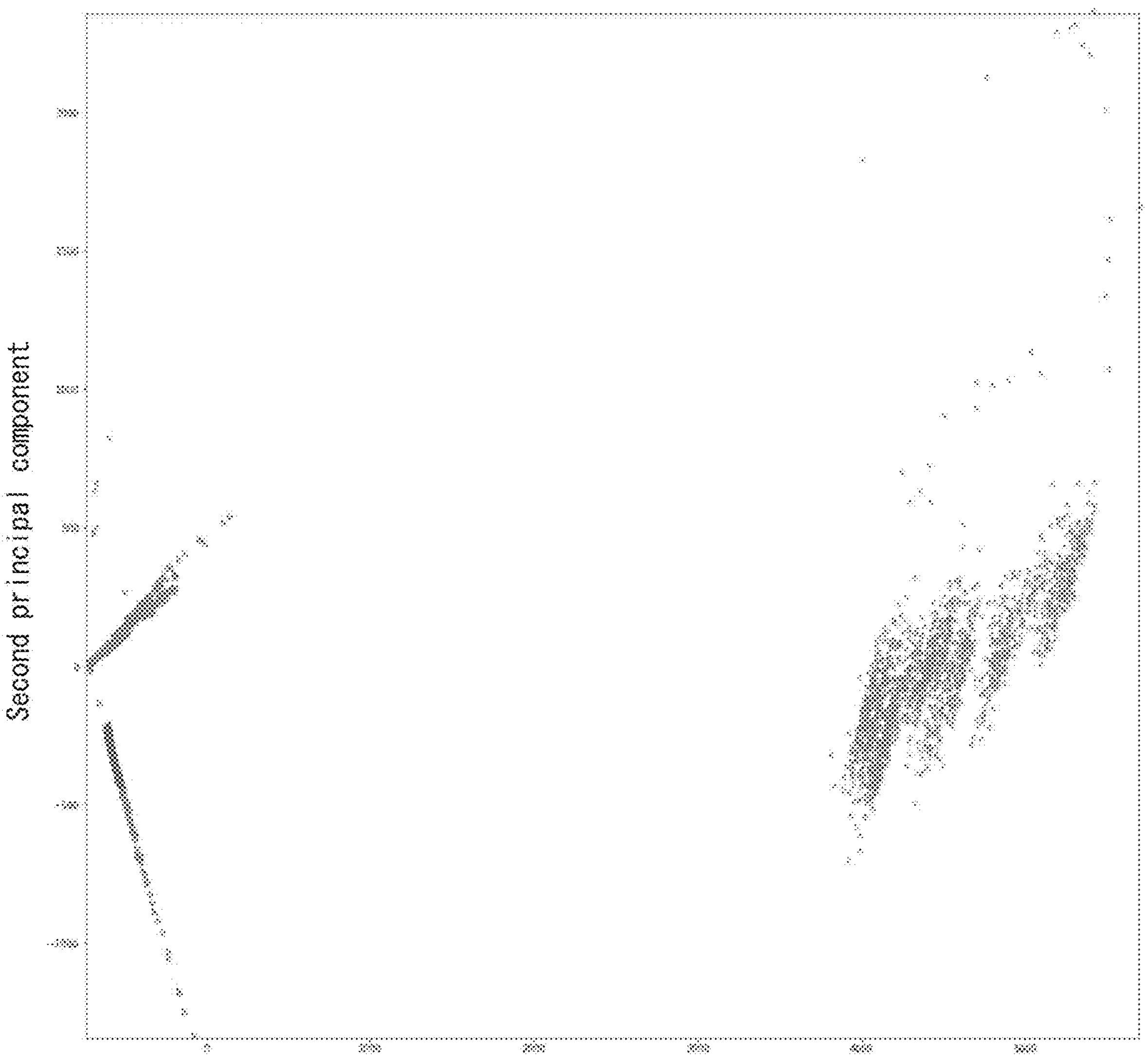
FIG. 16 is a diagram showing an example of a result of clustering by a principal component analysis according to the embodiment.
Figure 17:
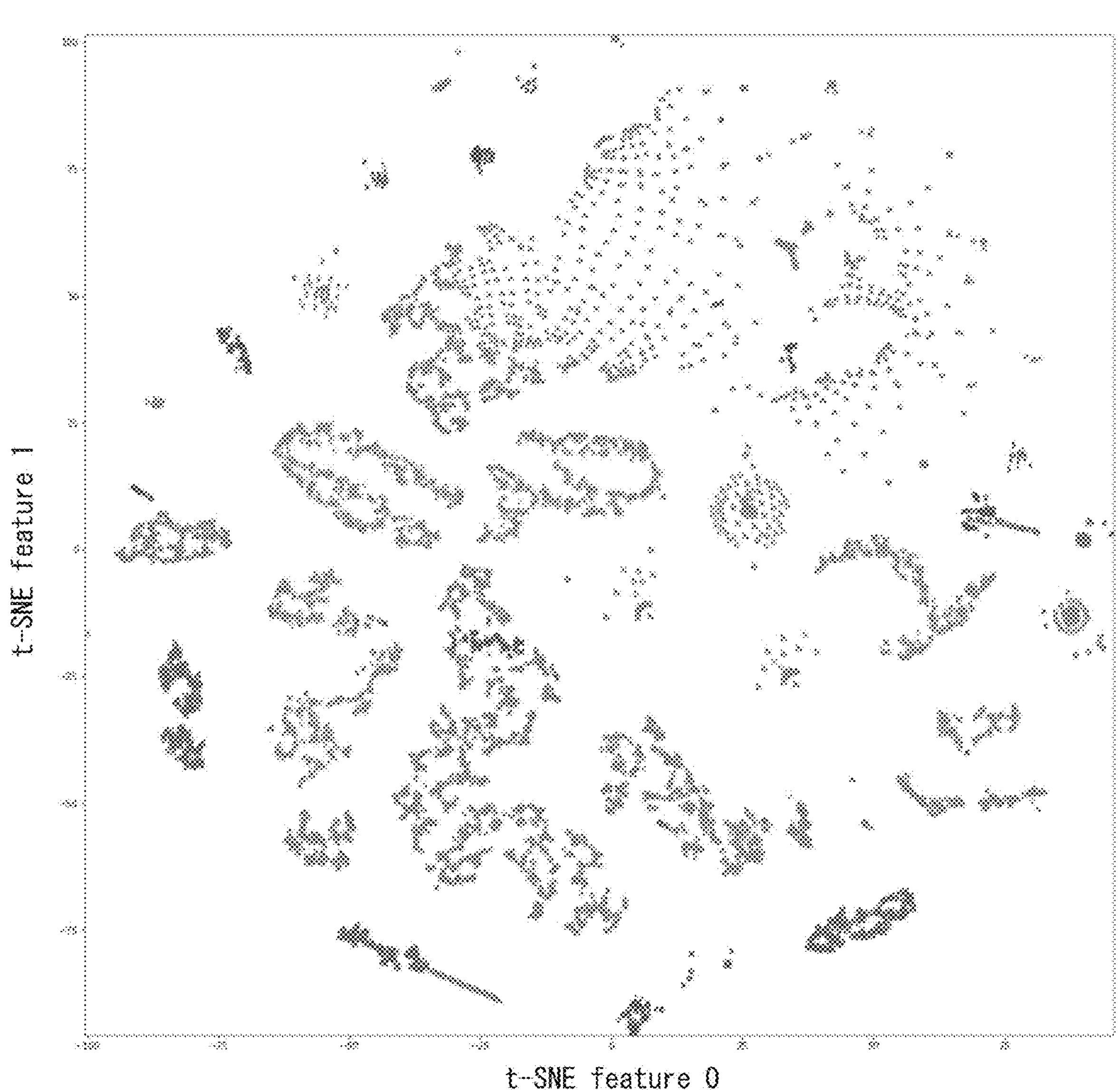
FIG. 17 is a diagram showing an example of a result of clustering by a TSNE analysis according to the embodiment.

Examples of results of machine learning processing in the present embodiment are shown with reference to FIGS. 16 and 17.

FIG. 16 is a diagram showing an example of a result of clustering by a principal component analysis according to the embodiment.

FIG. 16 shows a result of clustering color data of a moving image including abnormal discharge by the principal component analysis with labels abc for ten most frequent types of total event status information.

Furthermore, although a schematic example is shown in FIG. 16, in practice, for example, colors and types of markers may be distinguished by ranking of the total event status information.

FIG. 17 is a diagram showing an example of a result of clustering by a TSNE (T-distributed Stochastic Neighbor Embedding) analysis according to the embodiment.

FIG. 17 shows a result of clustering color data of a moving image including abnormal discharge by the TSNE analysis with labels abc for ten most frequent types of the total event status information.

Furthermore, although a schematic example is shown in FIG. 17, in practice, for example, colors and types of markers may be distinguished by ranking of the total event status information.

[Example of Processing Procedure Performed in Information Processing Device 12]

Figure 18:
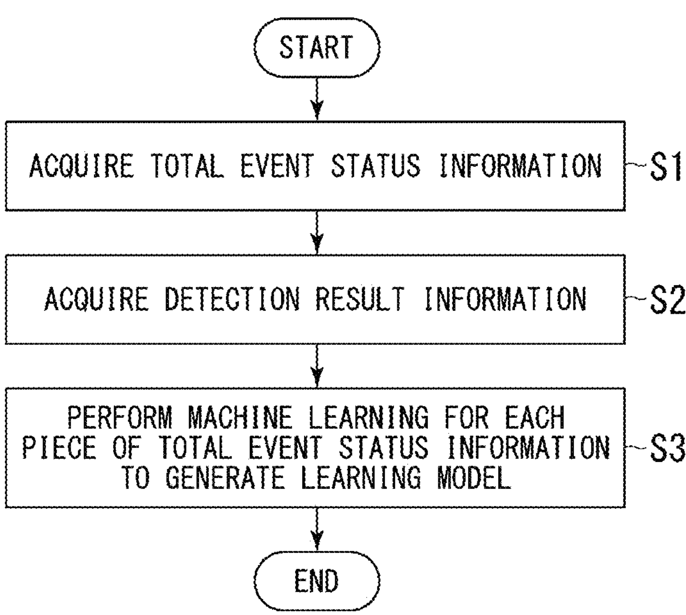
FIG. 18 is a diagram showing an example of a procedure of processing at the time of machine learning in an information processing device according to the embodiment.

FIG. 18 is a diagram showing an example of a procedure of processing at the time of machine learning in the information processing device 12 according to the embodiment.

(Step S1)

In the information processing device 12, the first acquisition unit 151 acquires total event status information to be learned.

Then, in the information processing device 12, the processing proceeds to step S2.

(Step S2)

In the information processing device 12, the second acquisition unit 152 acquires data of detection result information to be used as teacher data.

Then, in the information processing device 12, the processing proceeds to step S3.

(Step S3)

In the information processing device 12, the machine learning processing unit 153 performs machine learning on the data of the detection result information for each piece of the total event status information and generates the learning models A1 to AN for each piece of the total event status information.

Then, the information processing device 12 ends the processing of the present flow.

Furthermore, in the information processing device 12, a plurality of learning models A1 to AN for each piece of the total event status information may be generated, for example, one by one, or these plurality of learning models A1 to AN may be generated by parallel processing.

Also, the processing of step S1 and the processing of step S2 may, for example, be reversed in order or processed in parallel.

Figure 19:
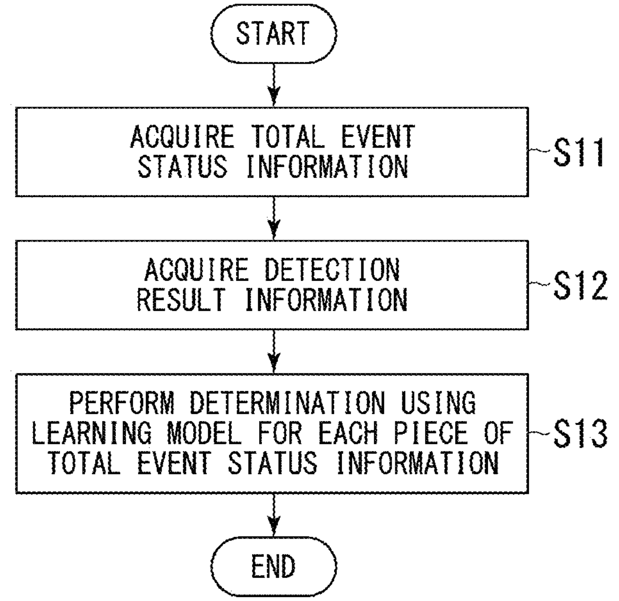
FIG. 19 is a diagram showing an example of a procedure of processing at the time of determination in the information processing device according to the embodiment.

FIG. 19 is a diagram showing an example of a procedure of processing at the time of determination in the information processing device 12 according to the embodiment.

(Step S11)

In the information processing device 12, the first acquisition unit 151 acquires total event status information to be determined.

Then, in the information processing device 12, the processing proceeds to step S12.

(Step S12)

In the information processing device 12, the second acquisition unit 152 acquires data of detection result information to be determined.

Then, in the information processing device 12, the processing proceeds to step S13.

(Step S13)

In the information processing device 12, the machine learning processing unit 153 performs a determination on the data of the detection result information to be determined by using the learning models A1 to AN corresponding to each piece of the total event status information to acquire the determination result.

Then, the information processing device 12 ends the processing of the present flow.

Furthermore, the processing of step S11 and the processing of step S12 may, for example, be reversed in order or processed in parallel.

Here, in the present embodiment, the machine learning processing and the determination processing are performed for each piece of the total event status information, but an optionally selected technology may be used or an existing technology may be used for, for example, the machine learning model, processing of the machine learning itself, and processing of determination itself using the learned model.

[Example of Variation in Referencing Method of Data]

FIGS. 20A, 20B, 20C, and 20D are diagrams showing examples of variation in referencing method of data according to the embodiment.

In the examples shown in FIGS. 20A to 20D, it is assumed that there are a chamber A serving as the load lock chamber, a chamber B serving as the transfer chamber, and chambers C, D, E, and F serving as the processing chambers.

In the examples shown in FIGS. 20A to 20D, time and total event status information are associated with time and time-series data.

In the example shown in FIG. 20A, all data are classified.

Specifically, data related to all chambers A to F are used for both the time and total event status information and the time and time-series data.

In the example shown in FIG. 20B, data of chamber A only is classified.

Specifically, data related to the chamber A is used for both the time and total event status information and the time and time-series data.

In the example shown in FIG. 20C, two or more of any of the load lock chamber, the transfer chamber, and the processing chambers are classified in combination. Further, two or more of the same type may be used such as two or more processing chambers.

Specifically, in the example shown in FIG. 20C, data related to the chamber A and the chamber F are used for both the time and total event status information and the time and time-series data.

In the example shown in FIG. 20D, two or more of any of the load lock chamber, the transfer chamber, and the processing chambers are partially extracted and classified. Further, two or more of the same type may be used such as two or more processing chambers.

Specifically, in the example shown in FIG. 20D, data related to the chamber A and data related to a partial extract of the chamber F are used for the time and total event status information. Also, in the example shown in FIG. 20D, data related to the chamber A and data related to the chamber F are used for the time and time-series data.

Here, in the example shown in FIG. 20D, reduced total event status information is used for data of a portion of the F chamber other than the partial extract.

As described above, various aspects may be used as the referencing method of data.

For example, if the number of bits of the total event status information is large, time granularity may be extended. Specifically, conversion from 0.1 sec to 1 sec may be performed.

Also, for example, speeding up may be performed as appropriate by, for example, narrowing down to only a specific module.

Specific Example 1 of Implementation

For example, in constructing an abnormality detection system for the semiconductor manufacturing apparatus, there has been a problem that it is difficult to select teacher data when time-series data is used as the teacher data. Also, it was necessary to perform work of associating the time-series data with events, and this took a large amount of effort.

Therefore, a state of the device in the apparatus is represented by two to four values (1 to 2 bits). Further, status of a device group in the apparatus is represented by multi-bit device status bits (total event status information in the present embodiment) by accumulating the bits. The multi-bit value is used as a tag of a learning condition, and the time-series data is learned by each tag. Therefore, it is not necessary to associate the tags with the time-series data.

Here, processing data in a stable state is registered as the teacher data.

As units for executing processing of work in the semiconductor manufacturing apparatus, for example, a process job (PJ), a control job (CJ), and lot identification information (LOT ID) are used as units in the Semiconductor equipment and materials international (SEMI) standard.

For example, a period during which the PJ or CJ work has been processed with no problem in product yield is preferably used as the teacher data of the time-series data. In the information processing device 12, when PJ or CJ of the semiconductor manufacturing apparatus is selected, learning is completed with reference to the learning period of the time-series data from an execution record. Further, there are maintenance cycles, deterioration, and consumables in the semiconductor manufacturing apparatus. Therefore, it is preferable that the teacher data be registered, for example, evenly without concentrating the registration at one period.

When a sputtering apparatus is taken as an example, a period from the time of starting use of the target to the time of completion of use of the target, that is, a period of use of the target can be said to be one cycle. Therefore, after execution of mass production, data of one maintenance cycle in which no abnormality has occurred in the sputtering apparatus may be registered as the teacher data. In this case, there is a likelihood that the data will become a large amount and the learning will not end in an appropriate time, but for example, a wide range of sampling may be performed within one cycle of the period of use of the target to select the teacher data for learning.

Specific Example 2 of Implementation

For example, if there is a time lag between bit information (bit information of the total event status information in the present embodiment) and time-series data, there has been a problem that unnecessarily varied data is obtained. That is, if there is a sharp change in the time-series data at the beginning and end of the bit change, when a time lag occurs, the time-series data may change significantly and be determined to be abnormal.

Therefore, a range of the time error is determined in advance, and the information processing device 12 learns by shifting the time by an amount of the time error at the time of the learning. In the information processing device 12, for example, when both a result obtained by executing the learning with the time error and a result obtained by executing the learning without the time error are displayed, accurate abnormality determination can be made possible. Also, in order to make a stable determination after the operation of the semiconductor manufacturing apparatus, setting of an appropriate delay time may be performed for determination of completion from the start to the completion. The delay time is not particularly limited, and, for example, 0.1 sec to 0.3 sec or the like may be used.

Specific Example 3 of Implementation

For example, when a bit representing status of the device is acquired by a digital input (DI), there has been a problem that the DI at a passing point (Middle) is turned on in the middle of the operation from Top to Low and is learned as the status bit even in the middle of the operation.

Therefore, the information processing device 12 is configured to determine completion of the operation after a predetermined condition is satisfied for an active operation input of control software. Therefore, in the information processing device 12, the status bit is changed on the basis of the event of the start or completion of the operation. That is, when the DI is used as the status bit as it is, there are an appropriate status bit and an inappropriate status bit. Therefore, the inappropriate status bit is masked, and information after the information processing device 12 (or other devices such as the semiconductor manufacturing apparatus) has filtered a stabilization delay or chattering in the event information is adopted as the status bit.

[Regarding Above Embodiment]

As described above, in the information processing device 12 according to the present embodiment, for the object manufacturing apparatus 11 that manufactures an object by operating each of the plurality of devices for each event, it is possible to increase efficiency of the machine learning processing related to the time-series detection result information detected in the process of manufacturing the object by the object manufacturing apparatus 11.

In the information processing device 12 according to the present embodiment, the total event status information obtained by digitizing the device status of machine learning can be used as a tag at the time of clustering or used as a filter at the time of importing the teacher data.

In the information processing device 12 according to the present embodiment, it is possible to perform a determination by machine learning for each piece of the total event status information or the machine learning results.

Therefore, although generation of learning data for supervised learning may be generally difficult, the information processing device 12 according to the present embodiment can automatically generate the learning data for supervised learning and can generate the learning data efficiently.

Also, in the information processing device 12 according to the present embodiment, if there is abnormal data from a result confirmed by another method, a label change can be made so that the abnormal data is excluded from the teacher data.

In the information processing device 12 according to the present embodiment, a period of data used for machine learning or a period of data used for determination can be determined according to information such as, for example, lots, substrates, carriers, recipes, or processing chambers.

In the information processing device 12 according to the present embodiment, a data model of status transition of the device can be reduced by performing machine learning for each piece of the total event status information.

Therefore, in the information processing device 12 according to the present embodiment, an amount of data to be saved can be reduced.

Also, in the information processing device 12 according to the present embodiment, an amount of information of the total event status information can be reduced by reducing information related to some devices, and thus efficiency can be increased.

In the information processing device 12 according to the present embodiment, it is possible to improve a synchronization performance with a sensor such as a camera in terms of signal processing. For example, there is a likelihood that a prediction accuracy will be improved by improving a synchronization accuracy between a learning time and an inference (determination) time.

Here, as data of the detection result information, for example, some or all of the time-series data detected by a sensor may be used as it is, or a result obtained by performing a calculation such as temporal averaging on the time-series data detected by the sensor may also be used.

Also, as data subject to the machine learning, for example, individual data such as sound data, image (including light) data, and vibration data may be used separately, or a plurality of data may be collectively used as an object to be subjected to the machine learning.

Also, in the present embodiment, a semiconductor manufacturing apparatus has been exemplified as the object manufacturing apparatus 11, but other apparatus having a plurality of devices, that is, an optionally selected apparatus, may be used as the object manufacturing apparatus 11. For example, a flat panel display (FPD) manufacturing apparatus or the like may be used.

For example, as the object manufacturing apparatus 11, an apparatus having one or more of a mechanism for transporting a substrate or the like, a mechanism for vacuum evacuation, and a mechanism for plasma processing may be used.

Furthermore, a program for realizing a function of an optionally-selected component in the optionally-selected apparatus described above may be recorded on a computer-readable recording medium, and the program may be read and executed by a computer system. Further, the "computer system" mentioned herein is a system including an operating system or hardware such as peripheral devices. Also, the "computer-readable recording medium" refers to a portable medium such as a flexible disk, a magneto-optical disk, a ROM, or a compact disc read-only memory (CD-ROM), and a storage device such as a hard disk incorporated in a computer system. Further, the "computer-readable recording medium" includes a recording medium that holds a program for a certain period of time such as a volatile memory inside a computer system serving as a server or a client when a program is transmitted via a network such as the Internet or a communication link such as a telephone circuit. The volatile memory may be, for example, a random access memory (RAM). The recording medium may be, for example, a non-transitory recording medium.

Also, the above-described program may be transmitted to other computer systems from the computer system storing the program in a storage device or the like via a transmission medium or by transmission waves in the transmission medium. Here, the "transmission medium" for transmitting the program refers to a medium having a function of transmitting information, such as a network like the Internet or a communication link like a telephone circuit.

Also, the above-described program may be a program for realizing a part of the above-described functions. Further, the above-described program may be a so-called differential file which is a program capable of realizing the above-described functions in combination with the program already recorded on the computer system. The differential file may also be referred to as a differential program.

Also, the function of the optionally-selected component in the optionally-selected apparatus described above may be realized by a processor. For example, each processing in the embodiment may be realized by the processor that operates on the basis of information such as a program and a computer-readable recording medium that stores information such as the program. Here, in the processor, for example, a function of each portion may be realized by individual hardware, or a function of each portion may be realized by integrated hardware. For example, the processor includes hardware, and the hardware may include at least one of a circuit that processes digital signals and a circuit that processes analog signals. For example, the processor may be configured using one or more circuit devices or one or more circuit elements mounted on a circuit board. An integrated circuit (IC) or the like may be used as the circuit device, and a resistor, a capacitor, or the like may be used as the circuit element.

Here, the processor may be, for example, a CPU. However, the processor is not limited to a CPU. For example, processors of various types such as a graphics processing unit (GPU) or a digital signal processor (DSP) may be used. Also, the processor may be, for example, a hardware circuit based on an application specific integrated circuit (ASIC). Also, the processor may be, for example, configured by a plurality of CPUs or configured by a hardware circuit based on a plurality of ASICs. Also, the processor may be configured by, for example, a combination of a plurality of CPUs and a hardware circuit based on a plurality of ASICs. Also, the processor may also include, for example, one or more of amplifier circuits, filter circuits, and the like that process analog signals.

While the embodiment of the disclosure has been described in detail with reference to the drawings, specific configurations are not limited to the embodiment. A design or the like within a range not departing from the gist of the present disclosure will be included in the embodiment.

Additional Statement (Configuration example 1) to (Configuration example 6) will be described.

Configuration Example 1

An information processing device including a first acquisition unit configured to acquire total event status information obtained by synthesizing event status information representing a status of an event of each of a plurality of devices for two or more devices for an object manufacturing apparatus, the object manufacturing apparatus being configured to manufacture an object by operating each of the plurality of devices for each event, a second acquisition unit configured to acquire time-series detection result information detected in a manufacturing process of manufacturing the object by the object manufacturing apparatus, and a machine learning processing unit configured to perform one or both of learning processing and determination processing, the learning processing being to generate a learning model by performing machine learning with the time-series detection result information acquired by the second acquisition unit as an input for each piece of the total event status information acquired by the first acquisition unit, the determination processing being to perform a determination on the generated learning model by inputting the time-series detection result information acquired by the second acquisition unit for each piece of the total event status information acquired by the first acquisition unit.

Configuration Example 2

The information processing device according to (configuration example 1), in which the total event status information includes a bit value representing a status of an operation result of the event for each of the plurality of devices.

Configuration Example 3

The information processing device according to (configuration example 2), in which the total event status information further includes a bit value representing a status of the event during operation of each of the plurality devices.

Configuration Example 4

The information processing device according to any one of (configuration example 1) to (configuration example 3), in which the two or more devices whose event status information is included in the total event status information are devices which are a part of all the plurality of devices of the object manufacturing apparatus.

Configuration Example 5

The information processing device according to any one of (configuration example 1) to (configuration example 4), in which the machine learning processing unit determines a period of the time-series detection result information to be subjected to the learning processing or the determination processing on the basis of any of lots, substrates, carriers, recipes, and processing chambers.

As described above, the information processing device includes the first acquisition unit configured to acquire the total event status information obtained by synthesizing event status information representing the status of the event of each of the plurality of devices for two or more devices for the object manufacturing apparatus manufacturing the object by operating each of the plurality of devices for each event, and the processing unit configured to perform a predetermined processing for each piece of the total event status information acquired by the first acquisition unit.

In such a configuration, for example, the predetermined processing may be applied to optionally-selected processing, and is applied to the machine learning processing in the embodiment.

It is possible to provide a processing method similar to the processing method performed by the information processing device as described above, and one configuration example will be described.

Configuration Example 6

An information processing method using a first acquisition unit, a second acquisition unit, and a machine learning processing unit. The first acquisition unit acquires total event status information obtained by synthesizing event status information representing a status of an event of each of a plurality of devices for two or more devices for an object manufacturing apparatus manufacturing an object by operating each of the plurality of devices for each event. The second acquisition unit acquires time-series detection result information detected in a manufacturing process of manufacturing the object by the object manufacturing apparatus. The machine learning processing unit performs one or both of learning processing and determination processing, the learning processing being to generate a learning model by performing machine learning with the time-series detection result information acquired by the second acquisition unit as an input for each piece of the total event status information acquired by the first acquisition unit, the determination processing being to perform a determination on the generated learning model by inputting the time-series detection result information acquired by the second acquisition unit for each piece of the total event status information acquired by the first acquisition unit.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information processing device comprising:

a storage device storing a program; and a hardware processor configured to execute the program to acquire total event status information obtained by synthesizing event status information representing a status of an event of each of a plurality of devices for two or more devices for an object manufacturing apparatus, the object manufacturing apparatus being configured to manufacture an object by operating each of the plurality of devices for each event;

acquire time-series detection result information detected in a manufacturing process of manufacturing the object by the object manufacturing apparatus; and perform one or both of learning processing and determination processing, the learning processing being to generate a learning model by performing machine learning with the time-series detection result information as an input for each piece of the total event status information, the determination processing being to perform a determination on the generated learning model by inputting the time-series detection result information for each piece of the total event status information.

2. The information processing device according to claim 1, wherein the total event status information comprises a bit value representing a status of an operation result of the event for each of the plurality of devices.

3. The information processing device according to claim 2, wherein the total event status information further comprises a bit value representing a status of the event during operation of each of the plurality devices.

4. The information processing device according to claim 1, wherein the two or more devices having the event status information included in the total event status information are devices which are a part of all the plurality of devices of the object manufacturing apparatus.

5. The information processing device according to claim 1, wherein the machine learning processing unit determines a period of the time-series detection result information to be subjected to the learning processing or the determination processing on the basis of any of lots, substrates, carriers, recipes, and processing chambers.

6. An information processing method comprising:

using a storage device and a hardware processor, the storage device being configured to store a program, the hardware processor being configured to execute the program to;

acquiring, by the hardware processor, total event status information obtained by synthesizing event status information representing a status of an event of each of a plurality of devices for two or more devices for an object manufacturing apparatus, the object manufacturing apparatus being configured to manufacture an object by operating each of the plurality of devices for each event;

acquiring, by the hardware processor, time-series detection result information detected in a manufacturing process of manufacturing the object by the object manufacturing apparatus; and performing, by a machine learning processing unit, one or both of learning processing and determination processing, the learning processing being to generate a learning model by performing machine learning with the time-series detection result information as an input for each piece of the total event status information, the determination processing being to perform a determination on the generated learning model by inputting the time-series detection result information for each piece of the total event status information.

* * * * *